(12) United States Patent
Meshot et al.

(10) Patent No.: US 11,734,478 B2
(45) Date of Patent: Aug. 22, 2023

(54) SPLICED SOFT-CORE INTERACTION POTENTIAL FOR FILLING SMALL-SCALE ENCLOSURES

(71) Applicants: Lawrence Livermore National Security, LLC, Livermore, CA (US); Regents of the University of California, Oakland, CA (US)

(72) Inventors: Eric Meshot, Oakland, CA (US); Austen Bernardi, Davis, CA (US); Roland Faller, Davis, CA (US)

(73) Assignees: Lawrence Livermore National Security, LLC, Livermore, CA (US); Regents of the University of California, Oakland, CA (US)

( * ) Notice: Subject to any disclaimer, the term of this patent is extended or adjusted under 35 U.S.C. 154(b) by 628 days.

(21) Appl. No.: 16/823,261

(22) Filed: Mar. 18, 2020

(65) Prior Publication Data
US 2020/0302098 A1 Sep. 24, 2020

Related U.S. Application Data

(60) Provisional application No. 62/820,146, filed on Mar. 18, 2019.

(51) Int. Cl.
*G06F 30/25* (2020.01)
*G06F 111/10* (2020.01)

(52) U.S. Cl.
CPC .......... *G06F 30/25* (2020.01); *G06F 2111/10* (2020.01)

(58) Field of Classification Search
USPC .......................................................... 703/2
See application file for complete search history.

(56) References Cited

U.S. PATENT DOCUMENTS

| 2014/0222398 A1* | 8/2014 | Yang | G06F 19/701 |
| | | | 703/2 |
| 2015/0142398 A1* | 5/2015 | Miller, III | G16C 10/00 |
| | | | 703/2 |

(Continued)

OTHER PUBLICATIONS

Ghoufi et al. ("Ultrafast diffusion of Ionic Liquids Confined in Carbon Nanotubes", Scientific Reports, 2016, pp. 1-9) (Year: 2016).*

(Continued)

*Primary Examiner* — Iftekhar A Khan
(74) *Attorney, Agent, or Firm* — Perkins Coie LLP

(57) ABSTRACT

A molecular dynamics system employing a spliced soft-core potential (the "MD/SSCP") facilitates studying the arrangement of particles in an enclosure and/or near an interface. In some embodiments, the MD/SSCP initializes a three-dimensional representation containing the enclosure and the particles in a first arrangement. The MD/SSCP conducts a first simulation to transition the representation to a second arrangement, during which the particles are allowed to move through a wall of the enclosure while the SSCP is unengaged. The MD/SSCP conducts a second simulation to transition the representation to a third arrangement, during which it becomes more difficult for the particles to move through the wall of the enclosure while the SSCP is gradually engaged. The MD/SSCP conducts a third simulation to transition the representation to a fourth arrangement of the particles, during which it becomes almost impossible for the particles to move through the wall of the enclosure.

32 Claims, 14 Drawing Sheets
(8 of 14 Drawing Sheet(s) Filed in Color)

(56) References Cited

U.S. PATENT DOCUMENTS

| | | | | |
|---|---|---|---|---|
| 2015/0178442 A1* | 6/2015 | Abel | .............. | G16C 20/30 |
| | | | | 703/2 |
| 2017/0304447 A1* | 10/2017 | Noy | .............. | C12Q 1/6869 |
| 2018/0285534 A1* | 10/2018 | Yang | .............. | G16C 20/90 |
| 2020/0167439 A1* | 5/2020 | Mailoa | .............. | G06N 10/00 |
| 2020/0238284 A1* | 7/2020 | Meshot | .............. | B01L 3/502715 |
| 2020/0338505 A1* | 10/2020 | Buchsbaum | .............. | B01D 69/148 |

OTHER PUBLICATIONS

Koga et al. ("Formation of ordered ice nanotubes inside carbon nanotubes", Nature 412, 2001, pp. 802-805) (Year: 2001).*

Mattia et al. ("Review: static and dynamic behavior of liquids inside carbon nanotubes", Microfluid Nanofluid (2008) 5:289-305) (Year: 2008).*

Steinbrecher et al. ("Soft-Core Potentials in Thermodynamic Integration. Comparing One- and Two-Step Transformations", J Comput Chem. 2011, pp. 3253-3263) (Year: 2011).*

Tappura et al. ("A New Soft-Core Potential Function for Molecular Dynamics Applied to the Prediction of Protein Loop Conformations", J Comput Chem. 2000, pp. 388-397) (Year: 2000).*

\* cited by examiner

SPLICED SOFT-CORE INTERACTION POTENTIAL FOR FILLING SMALL-SCALE ENCLOSURES

CROSS-REFERENCE TO RELATED APPLICATION(S)

This application claims priority to U.S. Provisional Patent Application No. 62/820,146 filed on Mar. 18, 2019, the entirety of which is incorporated herein by reference.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

The arrangement (e.g., the structure and dynamics) of atoms and molecules at interfaces and under confinement can be used to predict properties of a molecular system (e.g., conductivity, viscosity, severity of potential leakages, strength, etc.). For example, supercapacitors store electrochemical energy, typically within carbon-based nonporous electrodes, while electrolytes (e.g., ions in aqueous solution, polymer electrolytes, molten salts like bulky ionic liquid molecules) move and rearrange in response to charging and discharging. For example, supercapacitors can be used in consumer electronics to stabilize the power supply to electronics with fluctuating loads, such as laptops and other personal electronic devices, and/or can be used as a fast-charge power supply (e.g., a cordless screwdriver powered by supercapacitors can be charged in as little as 90 seconds). Supercapacitors are also used in energy harvesting, aviation, railways, electric vehicles, and numerous other applications. The structure of the electrolytes at the electrode's interface dictates the capacitive performance. Predicting the structure can therefore help to assess the efficacy of the supercapacitor and/or to help design supercapacitors with both high power density and high energy density. However, because molecular systems typically consist of a vast number of particles, it can be difficult to determine the arrangement of such systems analytically. Molecular dynamics simulations can be used to help overcome this difficulty to allow the study of the properties of a system and/or optimally design systems to include chosen properties.

A typical molecular dynamics simulation begins by defining an arbitrary initial state of the constituent particles being studied, then simulates their interactions over time. In particular, molecular dynamics methods use Newton's equations of motion to calculate the position and trajectory of every particle in the simulation system at a first time, steps forward one time-step by moving the particles to a new position according to their trajectory during the time step, and then to recalculate the trajectory of every particle in the system. Forces between the particles can be calculated using interatomic potentials (e.g., Pauli repulsion forces, Van der Waals forces, Coulombic forces, and/or gravitational forces), often while assuming a classical system for simplicity. By repeating the process numerous times (often for tens or hundreds of thousands of time steps), molecular dynamics simulations can model the evolution of a molecular system and can be used to predict the equilibrated arrangement of atoms, molecules, and/or other particles in the simulated system.

Classical molecular dynamics simulations, however, have various limitations. First, if the time required for the simulated particles to reach a final equilibrated arrangement (e.g., equilibrate inside a molecular enclosure) is comparable to or longer than the duration of the simulation, the results of the simulation may not accurately represent the equilibrated state (sometimes referred to as a timescales problem). Many molecules of interest, such as those in ionic liquids for example, are bulky and have slow diffusion coefficients such that the time required for the molecules to reach an equilibrated state is long. Avoiding the timescales problem in classical molecular dynamics simulations therefore requires equilibrating such molecules with long simulations, requiring significant computational resources. Further, while a classical molecular dynamics simulation's simulation system may appear to have equilibrated on the order of nanoseconds, it is possible that the system is still slowly, undetectably transitioning to the true equilibrated state. Ensuring that the true equilibrated state has been reached therefore also requires long simulation times and significant computational resources. In addition, classical molecular dynamics are limited to filling only finite enclosures through at least one opening. The limitation is problematic because the size of enclosures in applications tend to be orders of magnitude larger than those that modeled in atomistic molecular dynamics simulations, and extrapolating from the arrangement in a modeled finite enclosure to larger sizes may not accurately represent the arrangement in such larger sizes.

Accelerating molecular dynamics simulations without increasing computational resource demand and without compromising the accuracy of the results would unlock a new ability to study the properties of and/or optimally design small-scale systems computationally, without the need to construct the system in the real world to understand its properties.

BRIEF DESCRIPTION OF THE DRAWINGS

The patent or application file contains at least one drawing executed in color. Copies of this patent or patent application with color drawing(s) will be provided by the Office upon request and payment of the necessary fees.

DETAILED DESCRIPTION

Figure 1:
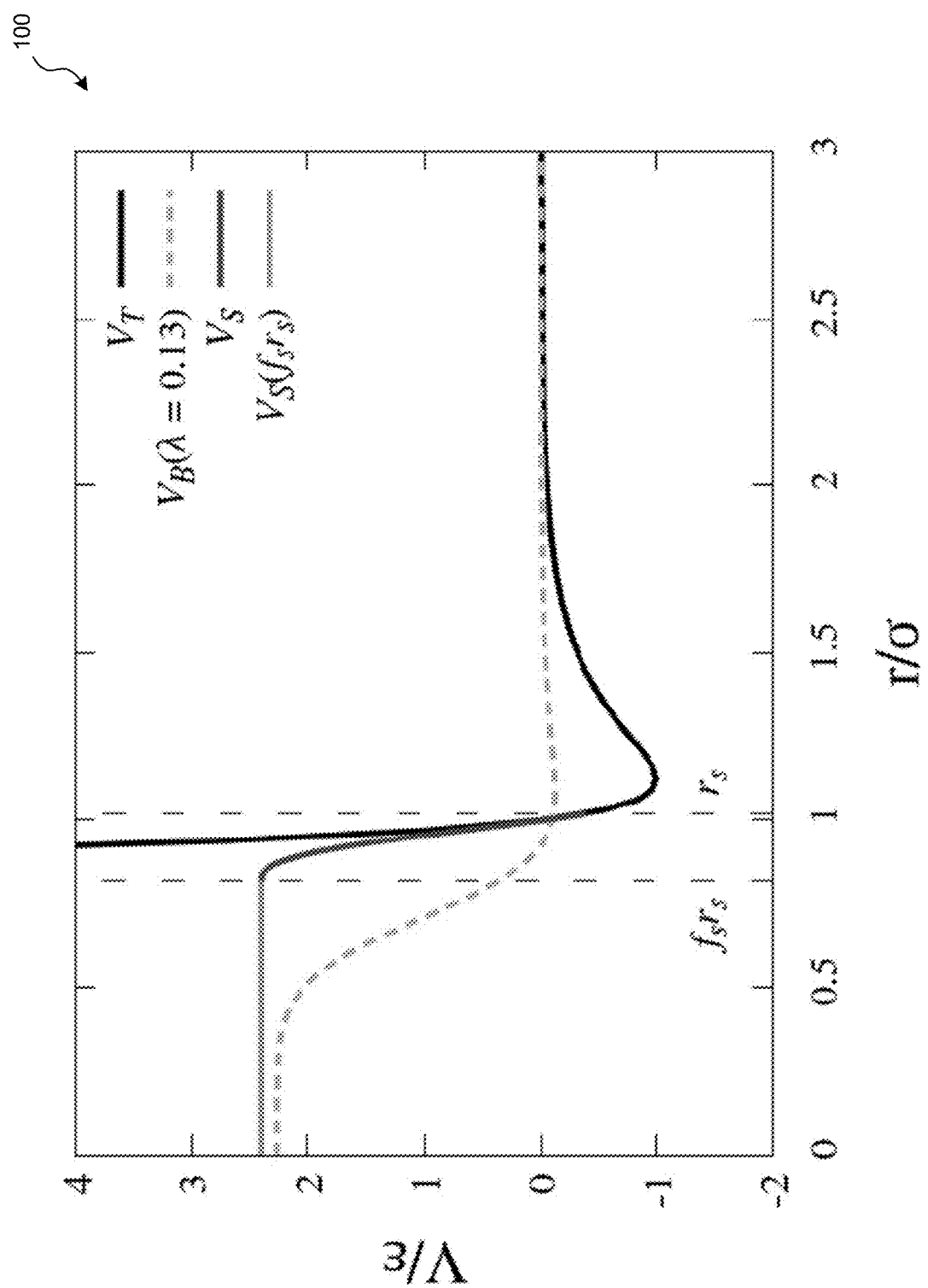
FIG. 1 is a graph showing a representative dimensionless profile of a spliced soft-core potential against a dimensionless profile of a target hard-core potential and the profile of a standard soft-core potential.

Systems and methods for applying a spliced soft-core interaction potential (SSCP) to molecular dynamics simulations are described herein. The SSCP can be used, for example, to approximate a target hard core interaction potential (HCP) (e.g., a Lennard-Jones potential) in a molecular dynamics simulation to approximate interactions between particles and a small-scale enclosure. The SSCP can be used to accelerate molecular dynamics simulations filling the enclosure (e.g., simulating the arrangement of particles inside the enclosure) and while improving accuracy with few, or no, additional computational resource demands. The simulated arrangements can be used study the properties of properties inside the enclosure. In particular, the SSCP is spliced in a way that allows the SSCP between particles and the enclosure to be slowly engaged. While the SSCP is weak, particles can move freely, or approximately freely, through the wall of the enclosure while the wall retains its character (e.g., imparting an inter-atomic force on particles inside and outside the container). The initial stage allows particles to begin arranging inside the container while fluidly moving in and out of the container as necessary. As the SSCP engagement is ramped up, it becomes gradually more difficult for particles to move through the wall of the container (e.g., it requires more energy to move through the wall). In some embodiments, when the SSCP is engaged, particles pass through the wall infrequently, instead arranging inside the enclosure. In some embodiments, particles still pass through the wall frequently when the SSCP is engaged. For example, in some embodiments, the particles may be at a high temperature such that they frequently have enough energy to pass through the wall. In these embodiments, the particles can then be cooled to reduce the frequency in which particles pass through the wall. In some embodiments, after the SSCP is fully engaged for some time, it can be swapped for the target HCP, making it impossible, or nearly impossible, for particles to move the wall of the enclosure. After the simulation is complete, the simulation system can facilitate studying the properties of the simulated arrangement (e.g., the arrangement of particles within the enclosure).

As used herein, a simulation is described in reference to the physical processes (e.g., heat and pressurize) that are being modeled. Thus, when a simulation is described as performing a physical process, the simulation is actually modifying a representation of the particles and the enclosure based on simulation models of the physical process.

In some embodiments, the SSCP can be deployed in conjunction with a simulated annealing technique (SSCP/SA). In these embodiments, a simulation can equilibrate a bulk material (of constituent particles, such as an ionic liquid containing anion and cation molecules) and an enclosure in separate simulation systems at a first temperature and a first pressure. In some embodiments, the first temperature and the first pressure can be the target temperature and the target pressure. In some embodiments, the first temperature and the first pressure can be selected to allow faster equilibration. The simulation can then overlap the simulation systems with interactions between the enclosure and bulk material unengaged (e.g., turned off). Because the SSCP is unengaged, particles in the bulk material feel no, or almost no, influence from the enclosure and are allowed to move freely, or nearly freely, throughout the system. In some embodiments, particles in the bulk material can completely overlap (e.g., occupy the same three-dimensional space) during this stage of the simulation. Next, the simulation can anneal the simulated system by heating and pressurizing the simulated system, causing the particles to move faster. In some embodiments, the simulation only anneals the bulk material to avoid unintended deformities and/or shape changes in the enclosure's structure at higher temperatures (e.g., the bulk material is separately thermostated). In some embodiments, pressure is regulated during annealing such that a constant density is maintained in the bulk material throughout the SSCP/SA. Next, the simulation can slowly engage the SSCP to begin simulating the arrangement of the bulk material contained in the enclosure based partly on the interatomic forces between the two. Because the simulation system is still relatively hot and pressurized, particles in the simulation system often have the required potential energy to move through the wall, even when the SSCP is fully engaged. The simulation then further anneals the simulated system by cooling and depressurizing the simulated system to a target temperature and pressure. As the simulated system cools, particle movement through the walls becomes less frequent, and particles instead move entirely within (or outside) the enclosure. This allows the bulk material to organize towards an equilibrate arrangement inside and outside the enclosure. In some embodiments, the simulation then switches the SSCP for the target HCP to simulate arrangement of the bulk material contained in the enclosure based partly on the full-strength interatomic forces between the two.

In other embodiments, the SSCP can be deployed in a slow growth thermodynamic integration (SGTI) simulation system (SSCP/SGTI). In these embodiments, a simulation initializes and equilibrates a bulk material and an enclosure in separate systems at the target temperature and pressure. The simulation can then overlap the systems with interactions between the enclosure and bulk material turned off. Next, the simulation can gradually engage only far-field interactions between the enclosure and the bulk material based on the SSCP, and then conducts far-field SGTI. During this simulation stage, particles can freely, or almost freely, move through the walls of the enclosure. Next, the simulation can gradually engage near-field interactions between the enclosure and the bulk material based on the SSCP, and then conducts near-field SGTI. During this simulation stage, movement through the walls becomes less frequent. Instead, particles instead move entirely, or almost entirely, within (or outside) the enclosure.

In the following, the molecular dynamics simulation employing an SSCP is described in the context of simulating an arrangement of an ionic liquid within a molecular enclosure, such as a carbon nanotube. In particular, the molecular dynamics simulation employing an SSCP is described in the context of simulating an arrangement of 1-butyl-3-methylimidazolium hexafluorophosphate ([BMIM$^+$][PF$_6^-$]) within a carbon nanotube with a radius between about 1.1 and about 2.0 nanometers (nm). These simulations allow for supercapacitors to be designed based on the results of the simulations without having to build and test supercapacitors with different characteristics (e.g., sizes and bulk materials). However, the SSCP may be used in a broad range of applications, such as simulating particles (individual atoms, molecules and/or ions, liquids and/or solids, and so on) in other enclosures (nanoscale and macro), the behavior of particles near interfaces, solid-state particle behavior, behavior of particles in biological systems, and various other applications.

By accelerating and improving the accuracy of molecular dynamics simulations of the arrangement of particles inside or near an enclosure, the methods disclosed herein can allow molecular enclosures to be optimally designed without the need to physically construct and analyze the enclosures. In some embodiments, the simulation can be used to model nanotechnological devices that have not yet, or cannot yet, be created. Studying the properties of particle arrangements therefore can also help direct research at more useful nanotechnological devices before they can even be created. Because molecular enclosure structures can be complicated to physically construct and study, the methods disclosed herein provide a significant improvement.

Certain details are set forth in the following description and in FIGS. 1-14 to provide a thorough understanding of various embodiments of the disclosure. However, other details describing well-known simulation methods, tools, and systems often associated with molecular dynamics and associated methods are not set forth below to avoid unnecessarily obscuring the description of various embodiments of the disclosure.

By way of example, the molecular dynamics simulation methods disclosed herein can be executed by one or more computer systems using LAMMPS with a Python® wrapper code. In some embodiments, the Mondal reduced-charge force field, which builds on the CL&P force field, can be used to model the ionic liquid. In some embodiments, the Walther force field parameters are used to model the carbon nanotube. In some embodiments, the Nose-Hoover thermostat and barostat are used for temperature and pressure control using time constants of 100Δt and 1000Δt, respectively. In some embodiments, covalent hydrogen bonds are constrained using RATTLE. In some embodiments, non-bonded interactions use a 1 nanometers (nm) short-range cutoff. In some embodiments, particle-particle-particle-mesh electrostatics is used with an accuracy of $10^{-5}$. In some embodiments, the SSCP is implemented using LAMMPS tabulated potentials, with a Table spacing of 0.01 Angstroms (Å). In some embodiments, the simulation can remove the linear momentum of the simulated system's center of mass every 100Δt. In embodiments simulating arranging an ionic liquid in a carbon nanotube, the initial ionic configurations can be generated using PACKMOL, and/or the initial carbon nanotube configurations can be generated using VMD's carbon nanotube builder. However, these are merely examples. It will be understood that various other simulation environments and/or approximations of forces can be used to implement the molecular dynamics simulations using an SSCP disclosed herein.

Overview

Accelerated simulation tools such as Monte Carlo simulations and/or soft-core potentials (SCP) can be used to circumvent the disparity of timescales problem in classical molecular dynamics identified above. For example, Monte Carlo simulations can operate directly on the number of particles within a simulated system to accurately arrive at an equilibrated arrangement. However, applying Monte Carlo simulations to ionic systems, systems with bulky molecules, and/or systems with an interacting enclosure requires significant computational resources.

In contrast, SCPs can be used in molecular dynamics simulations to save computational resources in ionic systems, systems with bulky molecules, and/or systems with an interacting enclosure. SCPs approximate a hard-core potential (HCP) defining interatomic interactions (based on, e.g., Pauli repulsion forces, Van der Waals forces, Coulombic forces, and/or gravitational forces), for example by approximating the Lennard-Jones potential, the Morse potential, and/or other custom HCPs. While SCPs can handle more complex systems without the same demand on computational resources, the inaccuracies in approximations lead to inaccuracies in the determined equilibrated arrangements.

The present technology employs a splice soft-core potential (SSCP) that better approximates the target HCP in various molecular dynamics simulation techniques. By more accurately modeling the target HCP, molecular dynamics simulations employing SSCP disclosed herein are able to more accurately simulate the final arrangement of particles in an enclosure. Further, molecular dynamics simulations employing the SSCP do not require long simulation timescales and do not demand significant computational resources to implement.

FIG. 1 is a graph 100 showing a representative dimensionless profile of the SSCP against a dimensionless profile of the target HCP and the profile of a standard SCP with an engagement parameter λ, described in more detail below, set to λ=0.13. In graph 100, the target HCP is shown as $V_T$, the SCP is shown as $V_B$, and the SSCP is shown in three segments:

$$V(r) = \begin{cases} V_S(f_s r_s) & 0 \leq r < f_s r_s \\ V_S & f_s r_s \leq r < r_s \\ V_T & r \geq r_s \end{cases} \quad (1)$$

The improvement in accuracy of V(r) over $V_B$ in modeling $V_T$ is readily apparent in FIG. 1. For example, in the illustrated embodiment, the SSCP exactly models the target HCP in the region $r > r_s$, which results in the enclosure retaining its character while the region where $r > r_s$. Further, this improved accuracy allows the SSCP to be maintained with a flat potential in in the region where $0 \leq r < f_s r_s$. The flat potential term can allow particles to continue to move through the walls of the enclosure to arrange, even after the SSCP is fully engaged. For example, in embodiments where the system is heated and pressurized before the SSCP is engaged, particles can still move through the engaged SSCP frequently, while the fit of the SSCP to the HCP maintains the accuracy of the simulation results. More details on the SSCP and the results of the improved accuracy are discussed below with respect to FIG. 5.

Figure 2:
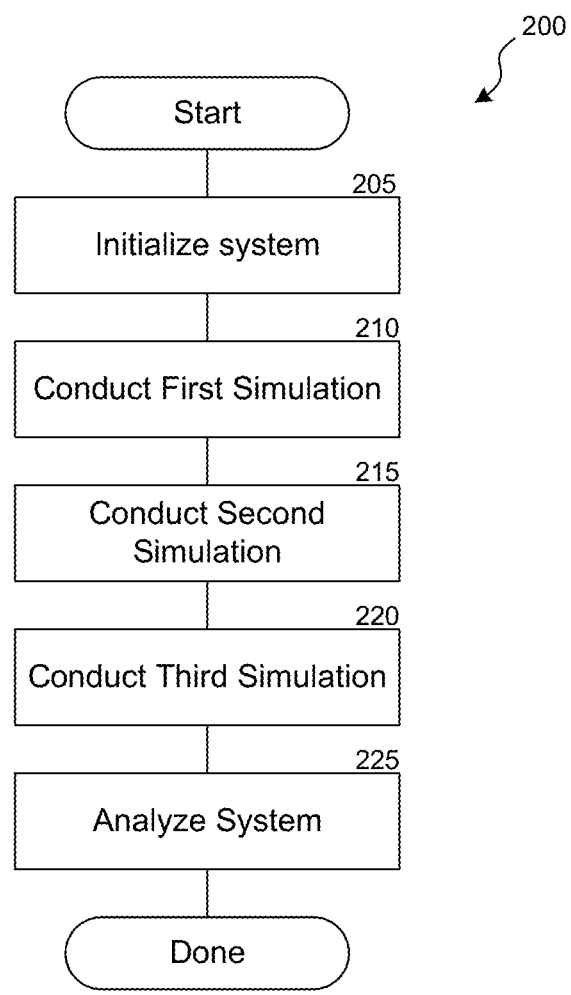
FIG. 2 is a flow diagram of a component for simulating the arrangement of particles within an enclosure using the spliced soft-core potential.

FIG. 2 is a flow diagram of a component 200 for simulating the arrangement of particles within an enclosure using the SSCP. In block 205, the component initializes the system. For example, at block 205, the component can initialize a three-dimensional representation containing the enclosure and the particles, wherein the particles are represented in a first arrangement in which the particles are distributed throughout the three-dimensional representation and allowed to overlap with the enclosure.

In block 210, the component conducts a first simulation, transitioning the three-dimensional representation from the first arrangement to a second arrangement of the particles. In some embodiments, the particles are allowed to move freely, or nearly freely, through a wall of the enclosure during the first simulation stage under the assumption that no repulsive force between the particles and the enclosure is engaged.

In block 215, the component conducts a second simulation, transitioning the three-dimensional representation from the second arrangement to a third arrangement of the particles. In some embodiments, the particles are still allowed to move through the wall of the enclosure under the assumption that only a fraction of the repulsive force between the particles and the enclosure is engaged.

In block 220, the component conducts a third simulation. In some embodiments, the particles are still allowed to move through the wall of the enclosure under the assumption that only a fraction of the repulsive force between the particles and the enclosure is engaged. In these embodiments, the third simulation simulates a cooling and depressurizing of the particles. In other embodiments, the HCP is engaged in the third simulation such that the particles are not allowed to move through the wall of the enclosure under the assumption the repulsive force between the particles and the enclosure is fully engaged. In still other embodiments, the component goes straight from block 215 to block 225, skipping the third simulation.

In block 225, the component analyzes the system, for example to determine one or more metrics about the represented particles. In various embodiments the metrics include the number of particles represented as contained in the enclosure, the position of the particles represented as contained in the enclosure, and/or the radial density of the particles represented as contained in the enclosure.

Figure 3:
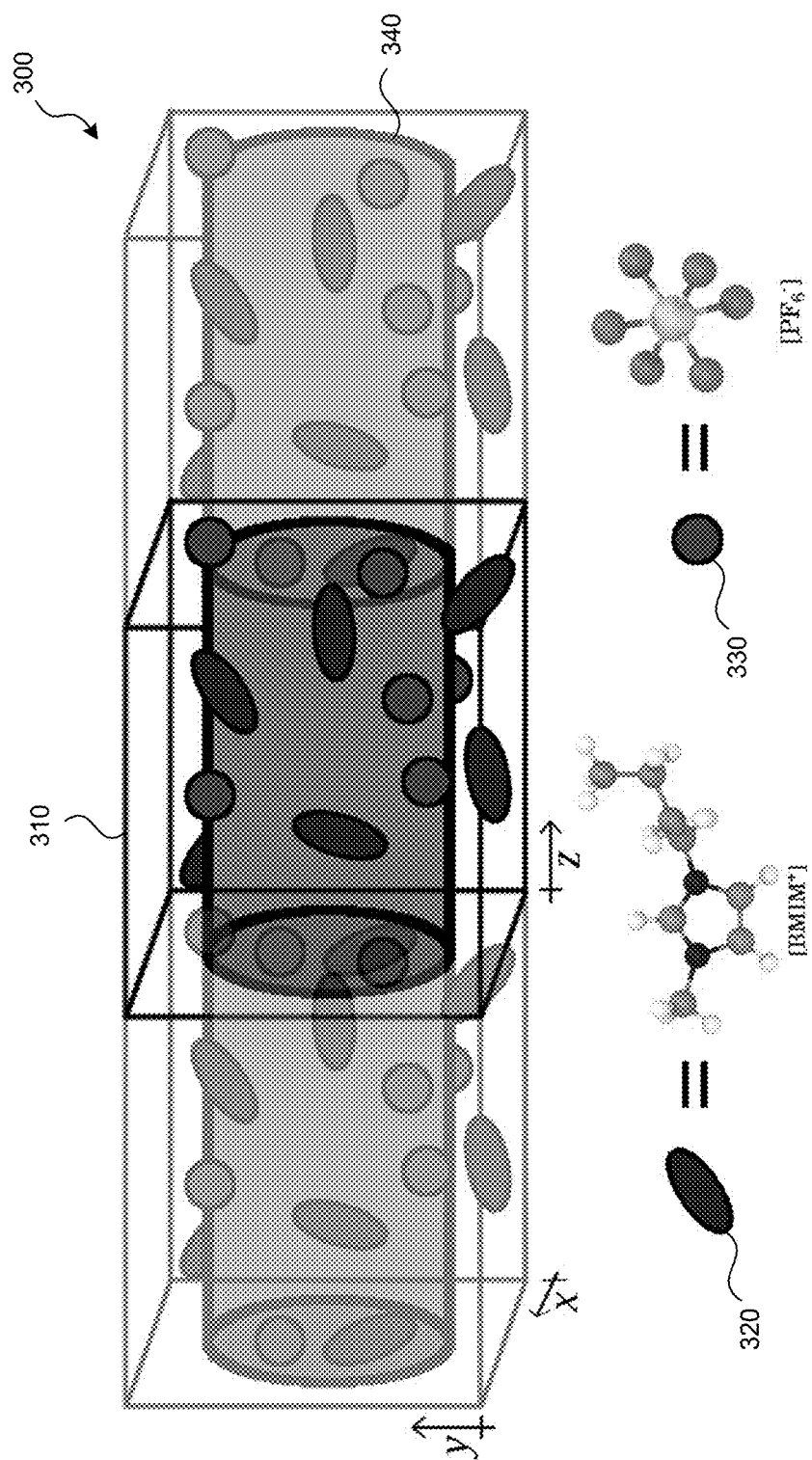
FIG. 3 is a schematic diagram of the three-dimensional representation having a simulation cell of a periodic carbon nanotube submerged in an ionic liquid.
Figure 4:
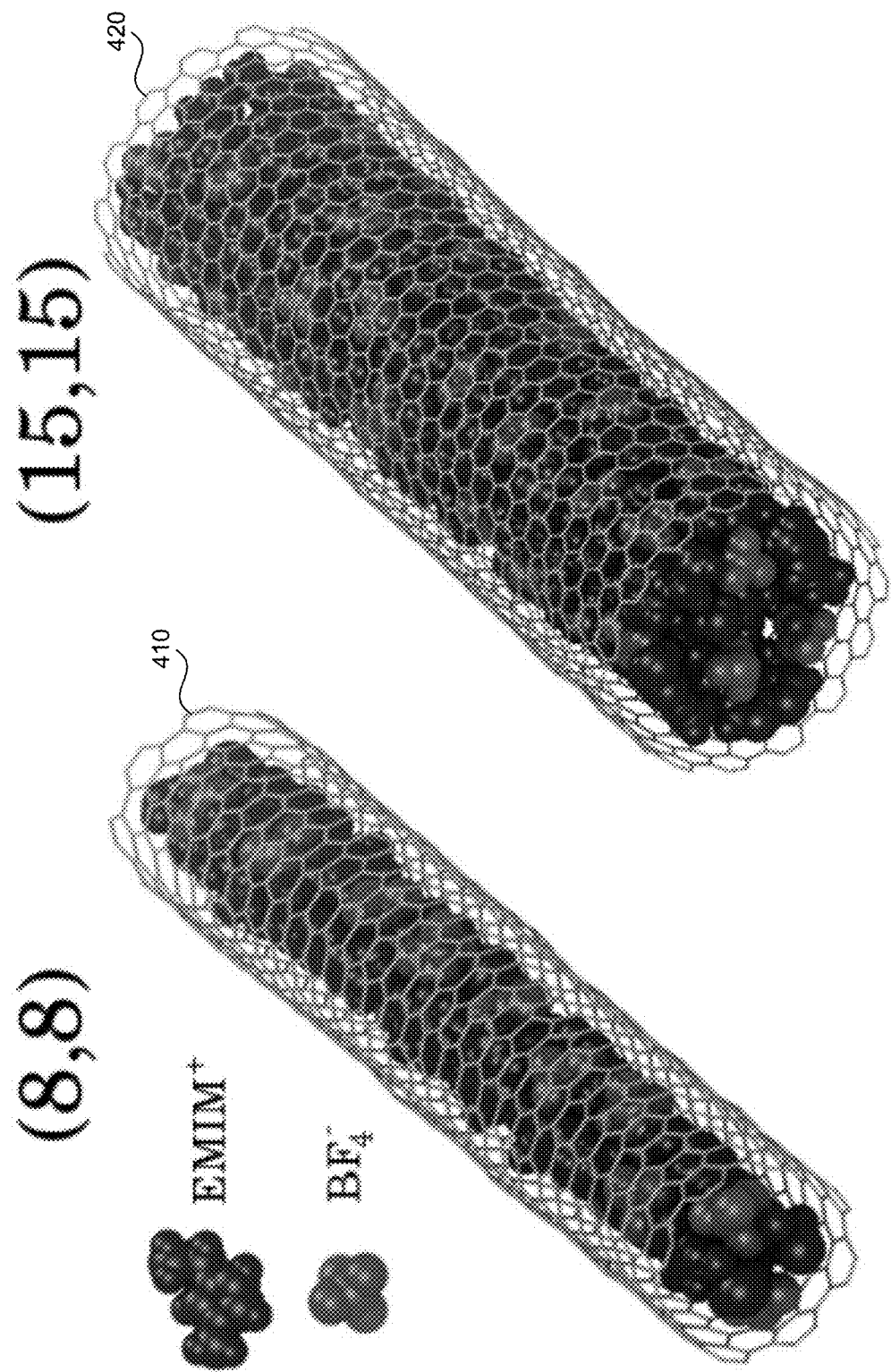
FIG. 4 is a schematic diagram of two three-dimensional representations after the component executes.

FIGS. 3 and 4 are schematic diagrams illustrating examples of the three-dimensional representation the component generates for the specific example of simulating the arrangement of an ionic liquid in a carbon nanotube.

FIG. 3 is a schematic diagram of the three-dimensional representation 300 having a simulation cell 310 of a periodic carbon nanotube 340 submerged in an ionic liquid. In the illustrated representation, the ionic liquid includes [BMIM$^+$] molecules 320 and [NF6] molecules 330. For illustration purposes, the representation includes neighboring periodic images of the carbon nanotube, shown in transparent neighboring cells. However, only the simulation cell is directly modified by the component in the molecular dynamics simulation.

Since the carbon nanotube is periodic, the component only modifies pressure in the x and y directions, while the axial z cell length is held constant. Using a periodic carbon nanotube eliminates the end effects present when simulating a finite carbon nanotube, allowing improved characterization of real nanopore systems.

FIG. 4 is a schematic diagram of two three-dimensional representations after the component 200 executes. Representation 410 corresponds to the arrangement of the ionic liquid in an (8,8) carbon nanotube having a diameter of approximately 1.08 nm and an axial length of approximately 7.123 nm. Representation 420 corresponds to the arrangement of the ionic liquid in an (15,15) carbon nanotube having a diameter of approximately 2.03 nm and an axial length of approximately 7.123 nm.

The Spliced Soft-Core Potential

The SSCP disclosed herein allows tunable hardness of the soft-core, and can be defined as the target HCP, or approximately the target HCP, for distances greater than the splice point. Further, in some embodiments, the engaged SSCP used in simulations permits particles to equilibrate across the enclosure's wall. In some embodiments, hardness of the SSCP can be selected such that, in practice, no particles move across the wall once the SSCP is fully, or nearly fully, engaged. As introduced above with respect to FIG. 1, the SSCP, V(r), is defined in three sections:

$$V(r) = \begin{cases} V_S(f_s r_s) & 0 \le r < f_s r_s \\ V_S & f_s r_s \le r < r_s \\ V_T & r \ge r_s \end{cases} \quad (2)$$

where $V_T$ is the target HCP (e.g., a Lennard-Jones potential); the splice point between $V_S$ and $V_T$ is $r_s$, which can be tuned to control the hardness of the SSCP; and $f_s$ is a positive fraction less than one, which defines the range over which V(r) is a flat potential. $V_S$ is a fourth order polynomial that joins the flat section of the potential to $V_T$, defined as:

$$V_S(r) = a(r-r_s)^4 + b(r-r_s)^3 + c(r-r_s)^2 + d(r-r_s) + e, \quad (2)$$

where $V_S$ is further defined by the conditions $$V_S(r_s) = V_T(r_s) \quad 1)$$

$$\left.\frac{dV_S}{dr}\right|_{r_s} = \left.\frac{dV_T}{dr}\right|_{r_s} \quad 2)$$

$$\left.\frac{d^2 V_S}{dr^2}\right|_{r_s} = \left.\frac{d^2 V_T}{dr^2}\right|_{r_s} \quad 3)$$

$$\left.\frac{dV_S}{dr}\right|_{f_s r_s} = 0 \quad 4)$$

$$\left.\frac{d^2 V_S}{dr^2}\right|_{f_s r_s} = 0, \quad 5)$$

which enforce (1) energy continuity at $r_s$, (2) force continuity at $r_s$ (e.g., where $V_S$ joins to the target HCP), (3) continuity in the derivative of force at $r_s$, (4) force continuity at $r=f_s r_s$ (e.g., where $V_S$ joins to a flat potential), and (5) continuity in the derivative of force at $r=f_s r_s$, respectively. Because the implementation of the potential and force is tabulated, enforcing continuity of the derivative of force does not result in additional computational costs. However, enforcing continuity in the derivative of the force increases the accuracy of the tabulated function by eliminating sharp changes that can propagate into inaccuracies in the simulated arrangements. The conditions yield $$e = V_T(r_s),\ d = \left.\frac{dV_T}{dr}\right|_{r_s},\ c = \frac{1}{2}\left.\frac{d^2 V_T}{dr^2}\right|_{r_s},\ b = \frac{4c\Delta r_s - 3d}{3\Delta r_s^2},\ a = \frac{c\Delta r_s - d}{2\Delta r_s^3},$$

where $\Delta r_s = r_s(1-f_s)$ is the length of the applied domain of $V_S$, such that when $f_s$ is close to zero, $\Delta r_s$ is large, and thus $V_S$ has a wide domain, and vice versa. In some embodiments, $f_s$ can be between about 0.5 and about 0.99, from about 0.75 to about 0.9, or about 0.8.

Figure 5:
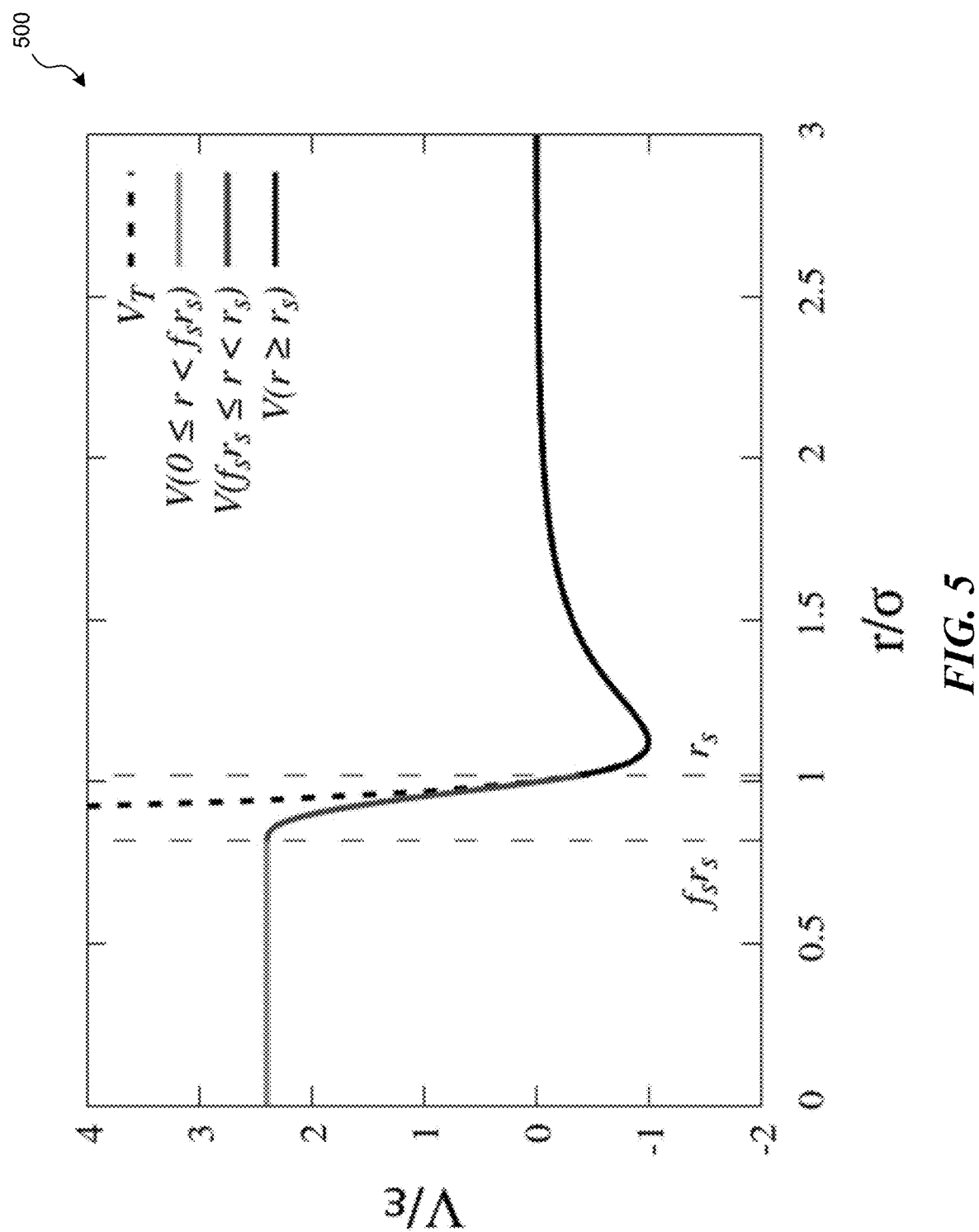
FIG. 5 is a graph showing a representative dimensionless profile of an embodiment of the spliced soft-core potential used in molecular dynamics simulations herein along with a profile of the target hard-core potential.

FIG. 5 is a graph 500 showing a representative dimensionless profile of an embodiment of the SSCP used in molecular dynamics simulations herein along with a profile of a target HCP. In the illustrated embodiment, $f_s=0.8$, $r_s=1.02$, and the target HCP is a 6-12 Lennard-Jones potential. Further, in the graph, $V(0 \leq r < f_s r_s)$ is illustrated in blue, $V(f_s r_s \leq r < r_s)$ is illustrated in red, $V(r \geq r_s)$ is illustrated in black, and the target HCP $V_T$ is illustrated in dashed black lines.

The splice point of $V(r)$ is the point where $V_S$ joins to $V_T$ (i.e., where the red and black lines meet in the graph). Because $V(r)$ is flat for $V(0 \leq r < f_s r_s)$ rather than infinite, particles in the simulation can move through the enclosure's wall during the simulation, provided the particle has more energy than the repulsive terms in Equation 1. In some embodiments, the amount of energy required to move through wall can be tuned by a hardness parameter (described below) and/or smoothly engaged (e.g., transitioned in) through an engagement parameter, $\lambda$. In some embodiments, $\lambda$ ranges from 0 (i.e., completely disengaged) to 1 (i.e., completely engaged) at various points in the simulation method. In other embodiments, $\lambda$ can range from some fractional of fully engaged to some other fraction of fully engaged. For example, in various embodiments, $\lambda$ can range from 0.1 to 0.9, from 0.2 to 1.0, or from 0 to 0.8 at various points in the simulation method.

In embodiments using the 6-12 Lennard-Jones potential for the target HCP, $V_T$ can be written with the engagement parameter as $$V_T(r) = 4\lambda \varepsilon \left[ \left(\frac{\sigma}{r}\right)^{12} - \left(\frac{\sigma}{r}\right)^6 \right] + \frac{kq_1(\lambda)q_2(\lambda)}{r}, \quad (3)$$

where $q_1$, representing the charge of a particle, and $q_2$, representing the charge of an atom in the enclosure are made explicit functions of $\lambda$. In embodiments where the particles and/or the enclosure are not simulated with a charge, the Coulombic term is zero. In other embodiments, the particles and enclosure are simulated with a charge. For example, in an embodiment where the particles are molecules in an ionic fluid and the enclosure is a carbon nanotube, the carbon nanotube can be given a charge that interacts with the charge of the ions in the ionic fluid.

When the SSCP is fully disengaged, the enclosure is uncharged. When the SSCP is fully engaged, the enclosure is at the target charge $n_C q_C$, where $n_C$ is the number of atoms in the enclosure, and $q_C$ is the charge of atoms in the enclosure. These criteria can be satisfied with the simple ramp condition $$q_2(\lambda) = \lambda q_C, \quad (4)$$

Where $q_1$ can be established by the charge neutrality of the overall system. Let $q_a$ represent the molecular charge of an anion, and $q_c$ the cation. Thus $$0 = n_a q_a(\lambda) + n_c q_c(\lambda) + \lambda n_C q_C, \quad (5)$$

where $q_a$ represents the molecular charge of an anion, $q_c$ represents the molecular charge of cation, and $n_a$ and $n_c$ are the number of anions and cations in the system, respectively, preselected to balance the final target enclosure charge. Minimizing the charge deviation of the ions with respect to their target charges yields $$q_1(\lambda) = q_1^T + \frac{1}{N_m}(q_m(\lambda) - q_m^T), \quad (6)$$

where $q_1^T$ is the target (engaged) atomic charge, $q_m^T$ is the target molecular charge, $N_m$ is the number of atoms in the molecule, and $$q_m(\lambda) = \begin{cases} \frac{n_c(q_a^T - q_c^T) - \lambda n_C q_C}{n_a + n_c} & \text{for anions} \\ \frac{n_a(q_c^T - q_a^T) - \lambda n_C q_C}{n_a + n_c} & \text{for cations} \end{cases} \quad (7)$$

where $q_a^T$ and $q_c^T$ are the target molecular charges for the anions and cations, respectively.

Engaging the SSCP in with an engagement parameter $\lambda$ as defined by equation (3) has several benefits. The 6-12 Lennard-Jones component is straightforwardly engaged via multiplication by $\lambda$, requiring minimal computation resources and simplifying incorporation into $V_S$.

The SSCP is designed such that it closely approximates the target potential once it is fully engaged (at $\lambda=1$). As disclosed above, however, the accuracy of the approximation can be tuned using a hardness parameter, defined as $$\Delta V_m = V(0) - V(r_m), \quad (8)$$

where $r_m$ is the location of the minimum of the Lennard-Jones potential, and the 'hardness' of the wall affects how much energy is required to move through the wall of the enclosure. For example, a higher $\Delta V_m$ will require particles in the simulation to have a higher energy to move through the wall. In some embodiments, the Coulombic term is small enough to be ignored in defining the hardness parameter. In these embodiments, the SSCP has only one adjustable parameter $r_s$ (assuming $f_s$ is fixed), such that $r_s$ may be written as a function of $\Delta V_m$ that can be solved using traditional numerical solvers well-known in the art:

$$r_s = \arg \min_{r_s}(V_S(f_s r_s) - V(r_m) - \Delta V_m)^2. \quad (9)$$

In some embodiments, $\Delta V_m$ can be independently parameterized for different types of particles in the system. For example, in embodiments where the particles are ions, $\Delta V_m$ can be independently parameterized for cations and anions in the simulation system. In other embodiments, $\Delta V_m$ can be parameterized uniformly for particles in the simulation system.

Spliced Soft-Core Potential and Simulated Annealing

In some embodiments, the SSCP defined above can be used in conjunction with simulated annealing techniques well-known in the art (SSCP/SA process).

Figure 6:
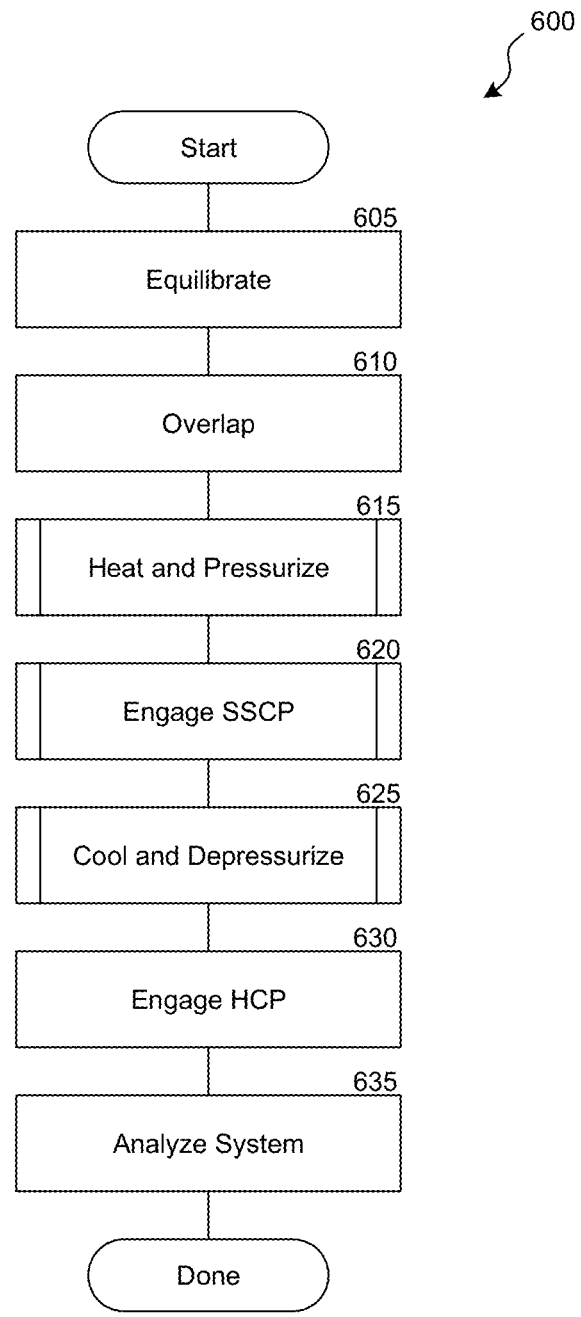
FIG. 6 is a flow diagram of a component for simulating the arrangement of particles within an enclosure using the spliced soft-core potential.

FIG. 6 is a flow diagram of a component for simulating the arrangement of particles within an enclosure using the SSCP. The component 600 uses an SSCP/SA approach to the simulation, beginning after initialization of a three-dimensional representation of the simulation system.

In block 605, the component equilibrates the particles and the enclosure at a first temperature and a first pressure. In some embodiments, the particles and the enclosure are equilibrated in separate systems, for example a bulk material system and an enclosure system. Other embodiments, the component can equilibrate the particles and the enclosure in the same system, for example an overlapped simulation system. In some embodiments, all interactions between the particles and the enclosure can be unengaged (e.g., turned off), allowing the particles and enclosure to equilibrate as if they are in separate systems. In embodiments where interactions are completely unengaged, individual particles can occupy the same three-dimensional space as atoms in the enclosure.

In block 610, the component overlaps the systems, for example into an overlapped system. In embodiments where the particles and enclosure are initialized and equilibrated in the same system, the component can skip this step.

In function block 615 the component heats and pressurizes the overlapped system to a second temperature and a second pressure. In some embodiments, the particles and the enclosure can be separately thermostated such that only the particles are heated and pressurized to avoid unintentional shape changes and/or other deformities in the enclosure. In some embodiments, the pressure of the system can be dependent on the temperature to regulate the pressure such that the particles have a constant density in the system throughout the SSCP/SA process.

In function block 620, the component engages an SSCP that affects interactions between the particles and the enclosure. In some embodiments, the SSCP can be transitioned from an unengaged state to the engaged state in steps to gradually introduce the SSCP between the particles and the enclosure using an engagement parameter. In some embodiments, the component can use a separate engagement parameter for various terms in the SSCP such that, for example, the Van der Waals potential term can be engaged separately from the Coulomb potential term. In some embodiments, the SSCP can be engaged in a single step. In some embodiments, particles can move through the walls of the enclosure while the SSCP is being engaged, allowing the particles to move towards an equilibrated arrangement. In some embodiments, the engaged SSCP can be have a hardness such that particles can still move through walls of the enclosure, provided they have the requisite energy, allowing the particles to continue to move towards an equilibrated arrangement.

In function block 625, the component cools and depressurizes the overlapped system to a third temperature lower than the second temperature and a third pressure lower than the second pressure with the SSCP engaged. In some embodiments, the third temperature is equal to the first temperature and the third pressure is equal to the third pressure. In some embodiments, the third temperature is equal to the target temperature and the third pressure is equal to the target pressure. In some embodiments, the SSCP can have a hardness such that particles rarely move through the walls of the enclosure as the system approaches the third temperature and the third pressure.

In block 630, the component swaps the target HCP in place of the SSCP (e.g., simultaneously, or nearly simultaneously, engages the target HCP and disengages the SSCP). In some embodiments, particles cannot move through the walls of the enclosure once the target HCP is engaged (e.g., assuming a classical mechanics paradigm and a sufficiently non-porous wall). In some embodiments, the component does not swap the HCP in place of the SSCP, and instead goes directly to block 635.

In some embodiments, the component can continue the simulation using the filled state of the enclosure after completing the steps above. Such continuing simulation may be of either classical or quantum-mechanical form.

In block 635, the component facilitates analyzing the overlapped system. For example, the component can record and/or output one or more metrics on the arrangement of the particles in the overlapped system, such as the number of particles in the enclosure, the position of particles in the enclosure, ratio of one type of particle to another type inside the enclosure, the radial density of particles inside the enclosure, and/or various measurements of the energy of the system (e.g., average particle energy, total energy, etc.).

Figure 7:
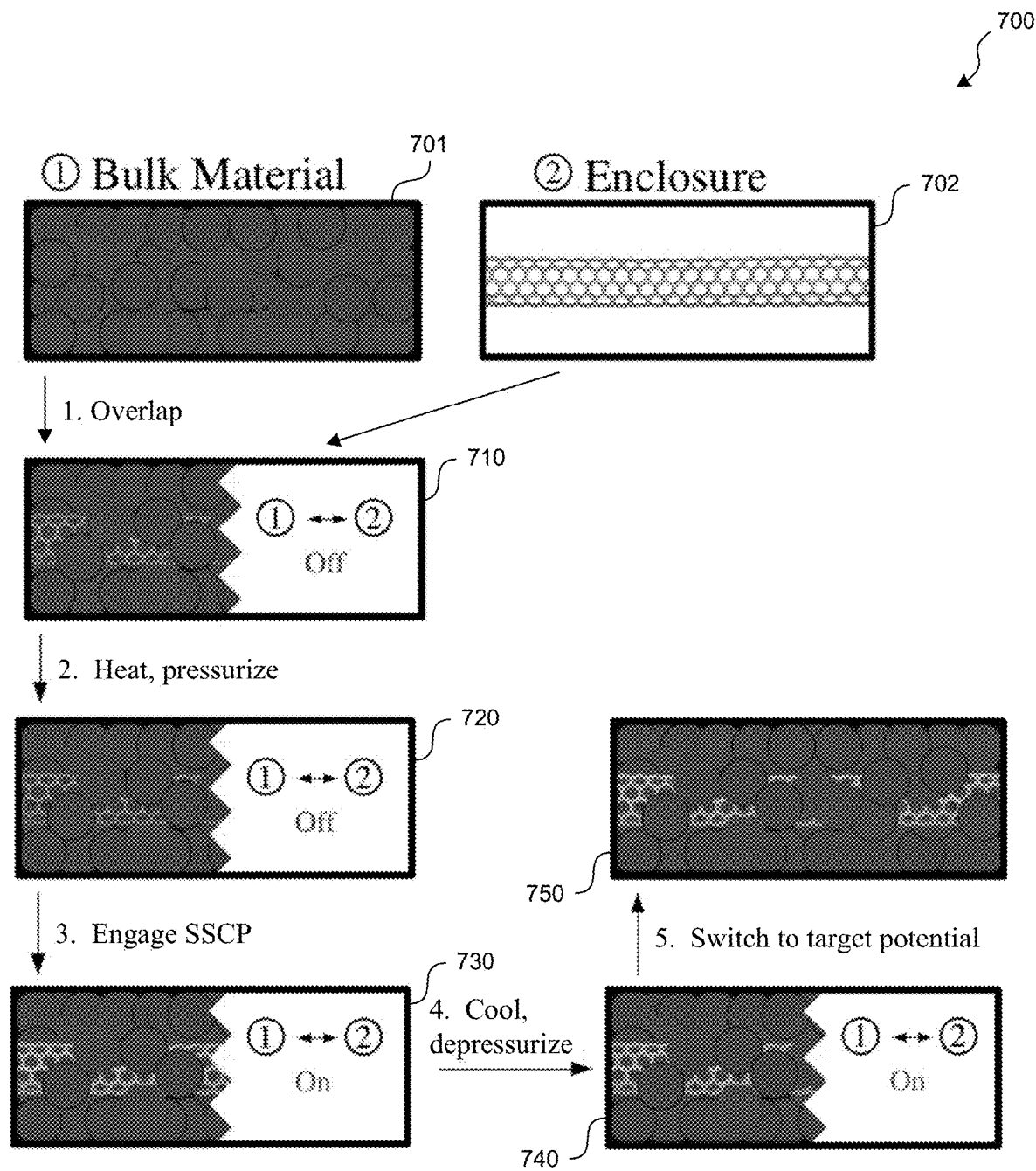
FIG. 7 is a schematic diagram of a particular embodiment of a process flow for arranging ionic liquid particles in a carbon nanotube according to the process outlined in FIG. 6.

FIG. 7 is a schematic diagram of a particular embodiment of a process flow for arranging ionic liquid particles in a carbon nanotube according to the process outlined in FIG. 6. In particular, the simulation process begins by initializing and equilibrating the ionic liquid particles in a bulk system 701 and initializing and equilibrating the carbon nanotube in an enclosure system 702. In representation 710, resulting from step 1, the two systems have been overlapped into an overlapped system while the SSCP is unengaged (e.g., turned off). In representation 720, resulting from step 2, the ionic liquid and/or the carbon nanotube have been heated and pressurized while the SSCP remains unengaged. In representation 730, resulting from step 3, the SSCP has been gradually engaged. In representation 740, resulting from step 4, the ionic liquid and/or the carbon nanotube have been cooled and depressurized while the SSCP remains engaged. In representation 750, resulting from step 4, the SSCP has been swapped for the target HCP.

In some embodiments, the processes that heat and pressurize (e.g., function block 615, step 2), engage the SSCP (e.g., function block 620, step 3), and cool and depressurize (e.g., function block 625, step 4) the overlapped systems can be performed on the same schedule. For example, in some embodiments, the processes can be performed in predefined, equal timesteps for a predefined run times, while adjusting parameters an equal and/or predefined step after each run time, for a predetermined number of runs.

In other embodiments, the processes can be performed using different schedules, adjusting the shape of the curve that describes the process variable as a function of time. In some embodiments, sigmoidal logistic schedules can be used for all three processes, $$R(t) = R_0 + \frac{R_f - R_0}{1 + \exp(-15(t - t_m))}, \quad (10)$$

where $R(t)$ is the process value at simulation time $t$, $R_0$ is the initial process value, $R_f$ is the final process value, and $t_m$ is the midpoint time of the process. The sigmoidal process schedule has the benefit that all derivatives at the beginning and end of the schedule tend towards zero, permitting smooth transitions between sequential processes. The two variables that follow the schedule in Equation 10 are temperature T and the SCP engagement parameter $\lambda$ defined above.

Further, in some embodiments, a temperature dependent timestep can be used. The temperature dependent timestep can be defined by $$\Delta t(T) = \Delta t_0 \sqrt{\frac{T_0}{T}} + cT + d, \quad (11)$$

where Δt(T) is the timestep at temperature T. In some embodiments, $\Delta t_0 = 1$ fs, and $T_0 = 300$ K. The first term in Equation 11 can be derived by maintaining a constant expected square displacement for any Δt(T). The last two terms can be added empirically added to ensure simulation stability, where constants c and d are conditioned by:

$$\Delta t(T_0) = \Delta t_0 \tag{12}$$

and $$\Delta t(T_{max}) = \frac{1}{2} \Delta t_0 \sqrt{\frac{T_0}{T_{max}}}, \tag{13}$$

where $T_{max}$ is the maximum simulation temperature. For example, in some embodiments, the maximum temperature can be from about 4000 K to about 2000 K, from about 3500 K, to about 2500 K, or about 3000 K. Applying the conditions to Equation 11 yields:

$$d = \frac{\Delta t_0}{2} \sqrt{\frac{T_0}{T_{max}}} \left( \frac{T_{max}}{T_0} - 1 \right)^{-1} \tag{14}$$

and $$c = \frac{-d}{T_0}. \tag{15}$$

Further, in some embodiments, pressure can be regulated such that a constant density is maintained in the particles throughout the simulated annealing using the SSCP. In order to regulate the pressure, the barostat pressure can be defined as a function of the thermostat temperature during simulated annealing/SSCP simulations. In some embodiments, the barostat pressure can be defined by:

$$P(T) = P_0 + a(T-T_0)^2 + b(T-T_0), \tag{16}$$

with fixed parameters for original temperature and pressure, and regressed parameters adjusting. In some embodiments, for example, $T_0 = 300$ K, $P_0 = 1$ atm, $a = -1.238 \times 10^{-3}$ atm·K$^{-2}$, and $b = 15.248$ atm·K$^{-1}$.

Figure 8:
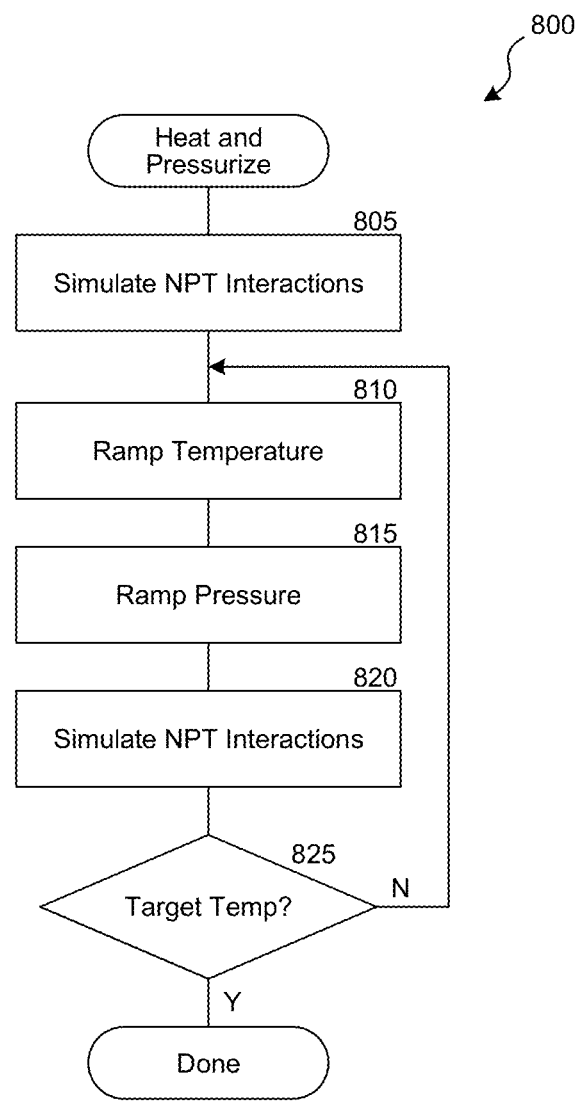
FIG. 8 is a flow diagram of a component for simulating heating and pressurizing the representation of the system.

FIG. 8 is a flow diagram of a component for heating and pressurizing the representation of the system. The heat and pressurize component 800 can be executed at function block 615 of FIG. 6 to implement simulated annealing while heating and pressurizing the particles and/or enclosure in the simulation method. In some embodiments, the particles and the enclosure can be separately thermostated and barostated, such that only the particles are heated and pressurized.

In block 805, the component simulates interactions in the overlapped system in an isothermal-isobaric ensemble at the first temperature and the first pressure. In some embodiments, the first temperature and the first pressure can be the target temperature and the target pressure. In some embodiments, the simulated isothermal-isobaric interactions can occur for a predefined number of timesteps having a predefined length per timestep Δt. In some embodiments, for example, the first temperature is 300 Kelvin (K), the first pressure is 1 atmosphere (atm), and the predefined number of timesteps is 100, with Δt=0.5 femtoseconds (fs) per step. In other embodiments, Δt can be determined using Equation 11 at the first temperature.

In blocks 810-825, the component ramps up (e.g., transitions through repeated steps) the temperature and pressure of the system. For example, in some embodiments, the component ramps temperature of the overlapped system from the first temperature to the second temperature in the repeated steps outlined in 810-820. In some embodiments, for example, the system is ramped from 300 K to 3000 K using Equation 10 every 100 timesteps. In some embodiments, the pressure can determined after an increase in temperature using Equation 16 in order to maintain constant density in the overlapped system, and/or the timestep size Δt(T) can be determined using Equation 11 as the temperature increases.

In block 810 the component ramps up the temperature in the overlapped system to a ramped temperature. In some embodiments, the component determines the ramped temperature using Equation 10. In some embodiments, the component can ramp the temperature according to predefined, equal steps.

In block 815 the component ramps up the pressure in the overlapped system to a ramped pressure. In some embodiments, the component can determine the ramped pressure using Equation 16 and the ramped temperature.

In block 820, the component simulates interactions in the isothermal-isobaric ensemble at the ramped temperature and the ramped pressure for some number of timesteps. In some embodiments, the component simulates isothermal-isobaric interactions for a predefined number of timesteps (e.g., 100 timesteps) at the ramped temperature and the ramped pressure. In some embodiments, the component determines the timestep size Δt(T) using Equation 11. In other embodiments, the timestep size can be equal at all temperatures.

In decision block 825, if the ramped temperature is the second temperature (e.g., 3000 K) the component completes, else the component returns to block 810 and ramps up the temperature again.

Figure 9:
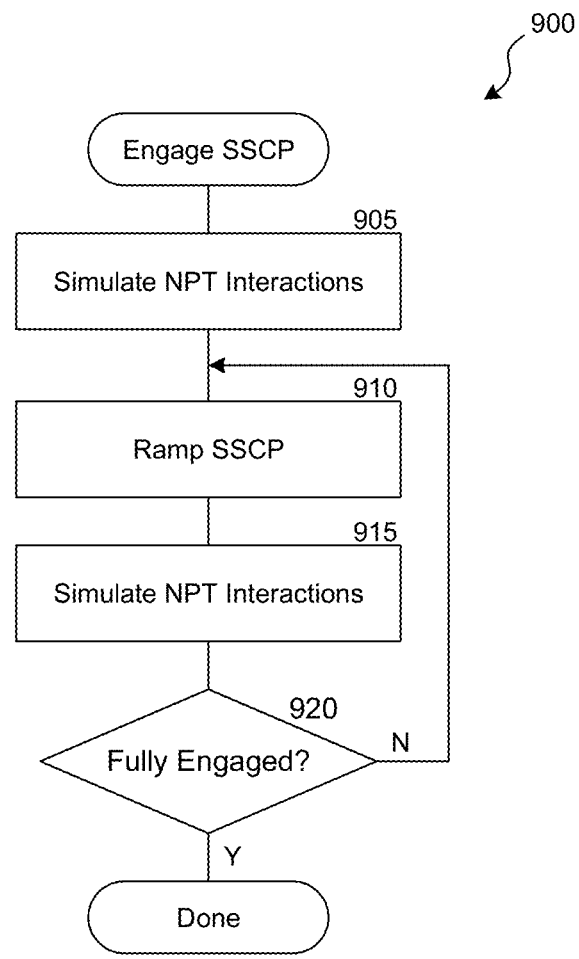
FIG. 9 is a flow diagram of a component for simulating engaging the spliced soft-core potential in the representation of the system.

FIG. 9 is a flow diagram of a component for engaging the SSCP in the overlapped system. The engage SSCP component 900 can be executed at function block 620 of FIG. 6.

In block 905, the component simulates interactions in the overlapped system in the isothermal-isobaric ensemble while the overlapped system is represented with the SSCP is in a first, damped state (e.g., a partially or fully unengaged SSCP, and/or an SSCP with a low hardness parameter).

In blocks 910-920, the component ramps up the engagement of the SSCP in the overlapped system from the first state to a second state in repeated steps. In some embodiments, the second state defines the fully engaged SSCP (e.g., λ=1 and/or fully hardened state).

In block 910, the component ramps the SSCP toward the second state. For example, in some embodiments, the component increases the engagement parameter λ of the SSCP to a ramped state using Equation 10, and propagates the effects of increasing λ using the definition of the $V_S$ given in Equation 2 and $V_T$ as given in Equation 3. In some embodiments, the component can ramp up the engagement of the SSCP by increasing the hardness parameter $\Delta V_m$ and propagating the effects.

In block 915, the component simulates interactions among particles and the enclosure in the overlapped system in the isothermal-isobaric ensemble using the SSCP in the ramped state. In some embodiments, while particles can move through walls of the enclosure while the SSCP is in the ramped state, assuming they have the required energy, allowing them to arrange inside and outside the enclosure while the enclosure maintains its character (e.g., imparts a force on the particles inside and outside the enclosure).

In decision block 920, if the SSCP is fully engaged (e.g., λ=1, or some predetermined max; and/or $\Delta V_m$ reaches a predetermined max) the component completes, else the component returns to block 910 and ramps up the SSCP.

Figure 10:
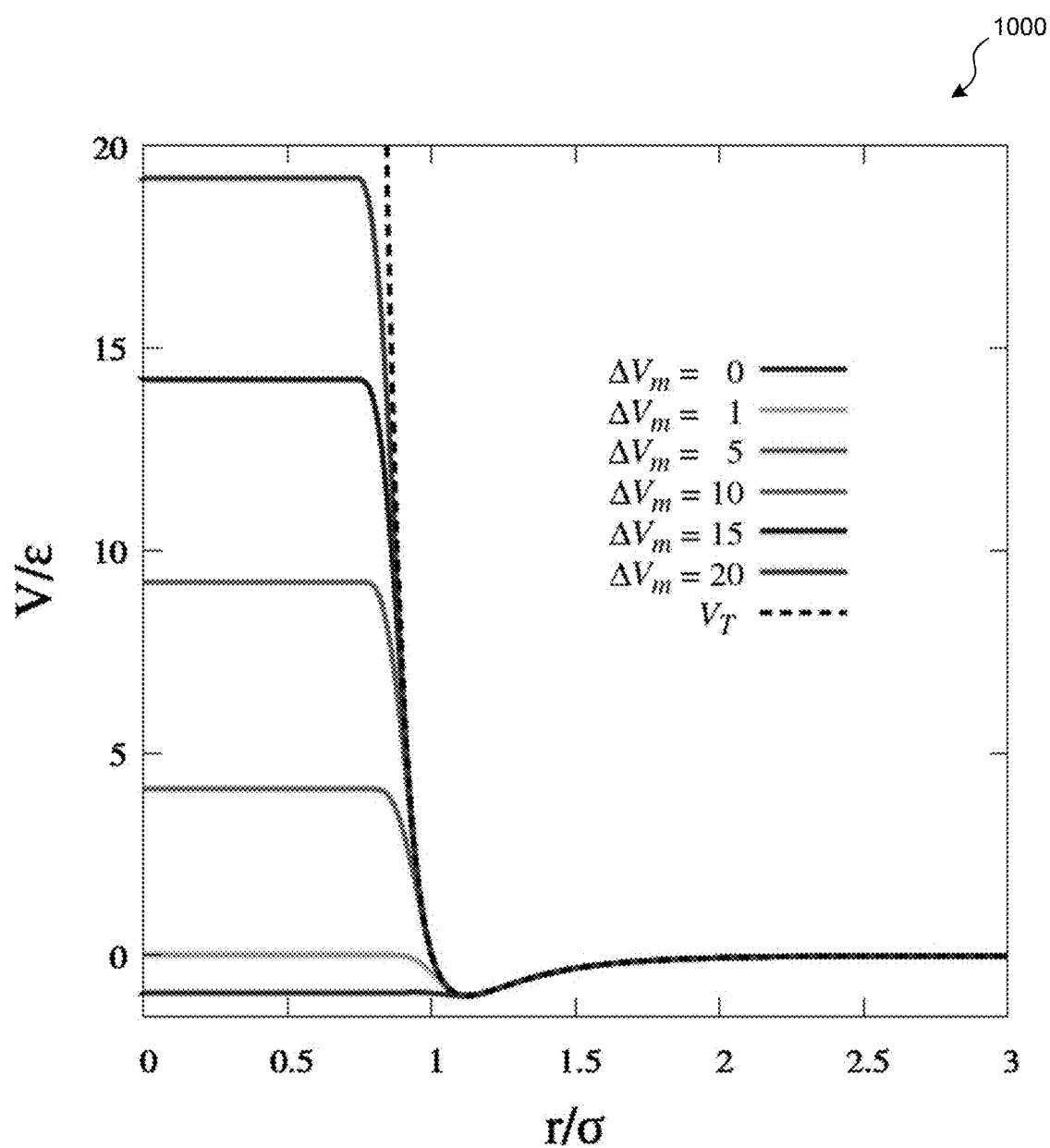
FIG. 10 is a graph showing representative dimensionless profiles of the spliced soft-core potential being slowly engaged by adjusting a hardness parameter according to some embodiments of the present technology.

FIG. 10 is a graph 1000 showing representative dimensionless profiles of the SSCP being slowly engaged by adjusting the hardness parameter $\Delta V_m$ according to some embodiments of the present technology. As $\Delta V_m$ increases, the profile of the potential increases in accuracy to the target HCP, $V_T$, illustrated as a dashed line. In other embodiments, the SSCP can be engaged using the engagement parameter $\lambda$ in the manner described above, and by gradually adjusted from a first parameter $\Delta_0$ to a second parameter $\Delta_f$. In some embodiments, $\lambda_0$ is 0 and $\Delta_f$ is 1. In other embodiments, $\lambda_0$ and $\Delta_f$ can be various other fractions below 1.

Figure 11:
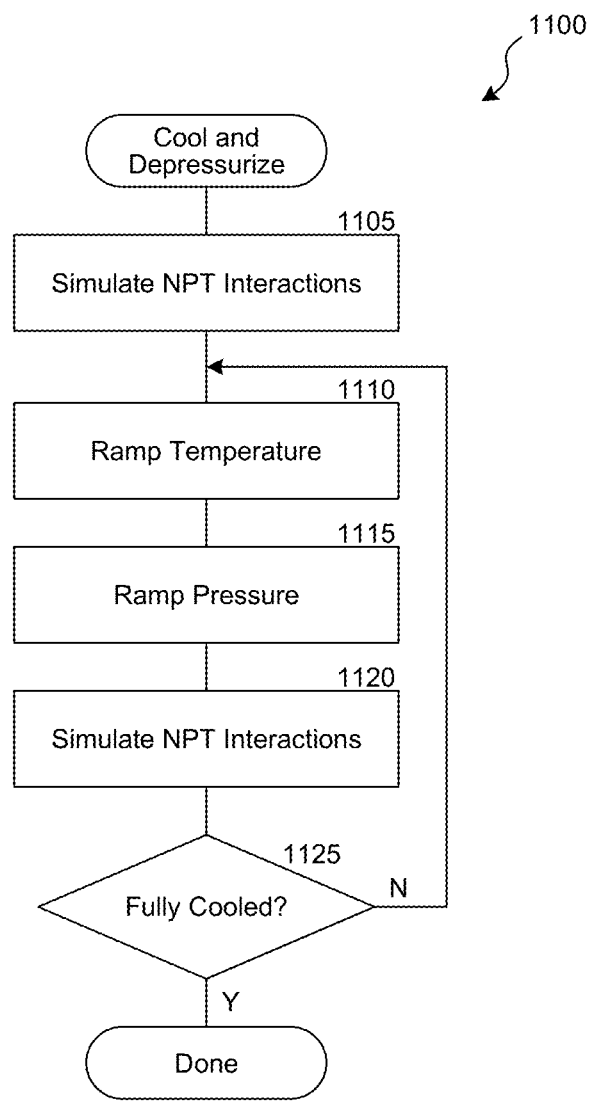
FIG. 11 is a flow diagram of a component for simulating cooling and depressurizing the representation of the system.

FIG. 11 is a flow diagram of a component for cooling and depressurizing the overlapped system. The cool and depressurize component 1100 can be executed at function block 625 of FIG. 6 to implement simulated annealing while cooling and depressurizing particles and/or the enclosure in the simulation method.

In block 1105, the component simulates interactions among particles and the enclosure in the overlapped system in the isothermal-isobaric ensemble at the second temperature and the second pressure. In some embodiments, the simulated interactions can occur for a predefined number of timesteps having a predefined length per timestep $\Delta t$. In some embodiments, for example, the second temperature is 3000 K, the second pressure is given by Equation 16 at 3000 K, and the predefined number of timesteps is 100, with $\Delta t = 0.5$ fs per step. In some embodiments, $\Delta t$ can be determined using Equation 11 at the second temperature.

In blocks 1110-1125, the component ramps down the temperature and pressure of the overlapped system. For example, in some embodiments, the component ramps temperature of the overlapped system from the second temperature to the third temperature in repeated steps. In some embodiments, for example, the system is ramped from 3000 K to 300 K using Equation 10 every 100 timesteps. In some embodiments, the pressure can determined after an decrease in temperature using Equation 16 in order to maintain constant density in the overlapped system, and/or the timestep size $\Delta t(T)$ can be determined using Equation 11 as the temperature decreases.

In block 1110 the component ramps down the temperature in the simulated system to a ramped temperature. In some embodiments, the component can determine the ramped temperature using Equation 10. In some embodiments, the component can ramp down the temperature according to predefined, equal steps.

In block 1115 the component ramps down the pressure in the simulated system. For example, in some embodiments, the component can modify the represented pressure to a ramped pressure given by Equation 16 using the ramped temperature.

In block 1120, the component simulates interactions in the isothermal-isobaric ensemble at the ramped temperature and the ramped pressure. In some embodiments, for example, the component simulates the interactions in the isothermal-isobaric ensemble for a predefined number of timesteps (e.g., 1000 timesteps) at the ramped temperature and the ramped pressure. In some embodiments, the component determines the timestep size $\Delta t(T)$ using Equation 11. In other embodiments, the timestep size can be equal at all temperatures.

In decision block 1125, if the ramped temperature is the third temperature (e.g., 300 K) the component completes, else the component returns to block 1110 and ramps down the temperature again.

Spliced Soft-Core Potential and Slow Growth Thermodynamic Integration

In some embodiments, the SSCP can be employed in a simulation that uses slow growth thermodynamic integration (SGTI) (SSCP/SGTI process). Implementing the SSCP/SGTI process is more involved than implementing SGTI using the traditionally-used SCPs. This is because traditional SCPs have a built-in parameter, which directly corresponds to a fully non-interacting SCP when the parameter is 0, and a fully interacting HCP when the parameter is 1. As described above, the SSCP's corresponding hardness parameter $\Delta V_m$ is actually defined by the splice point $r_s$; as $r_s$ goes to zero, the SSCP becomes the HCP.

Using SGTI to fill enclosures is performed with the following strategy, described in more detail below. First, equilibrate the bulk material to be enclosed and the enclosure in the same simulation system but with no interaction potential between the two, at the target temperature and pressure. Second, simulate the long-range stage of SGTI with the SSCP previously detailed. Third, simulate the short-range stage of SGTI with the SSCP previously detailed. Fourth, switch to the target HCP for all interactions and simulate to obtain equilibrated metrics of the enclosed state.

Figure 12:
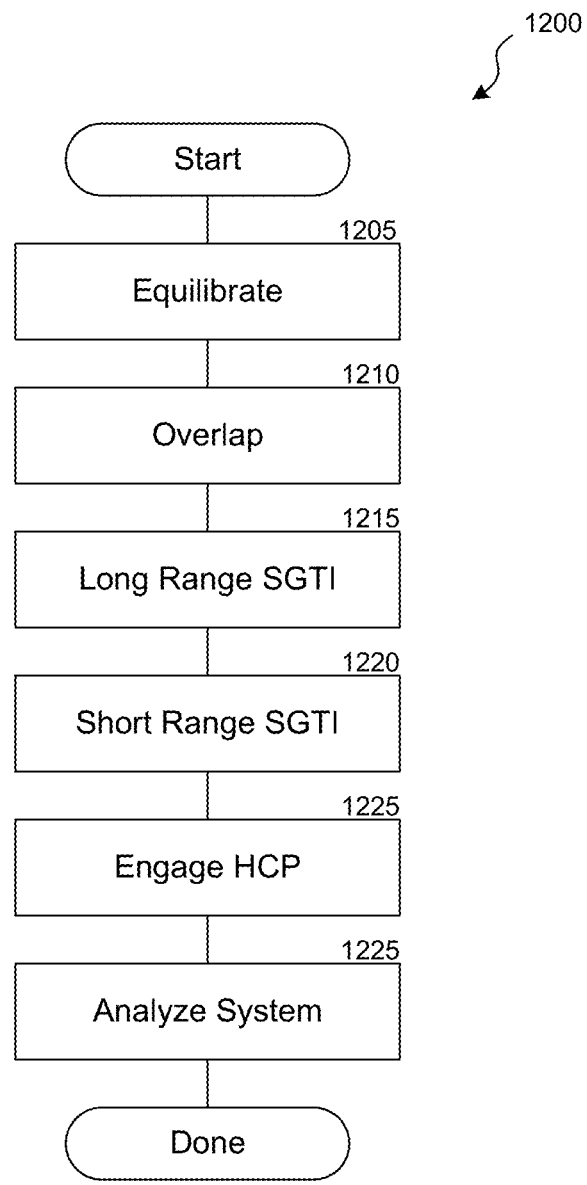
FIG. 12 is a flow diagram of a component for arranging particles in an enclosure using the spliced soft-core potential in a slow growth thermodynamic integration simulation.

FIG. 12 is a flow diagram of a component for simulating the arrangement of particles in an enclosure using the SSCP/SGTI process. The SSCP/SGTI component 1200 can begin after initializing a three-dimensional representation of the simulation system having particles in a bulk system and an enclosure in an enclosure system.

In block 1205 the component equilibrates the particles and the enclosure. For example, in some embodiments, the component equilibrates the particles in a bulk material system at a first temperature and a first pressure; and equilibrates the enclosure in an enclosure system the first temperature and the first pressure. In other embodiments, the component can equilibrate the particles and the enclosure in the same system (e.g., in an overlapped system). In the latter embodiments, the component can simplify equilibration by turning off (or maintaining as turned off) all interactions between the particles and the enclosure.

In block 1210, the component overlaps the systems into, for example, and overlapped system. In embodiments where the particles and the enclosure were initialized and equilibrated in the same system, the component can go directly to block 1215. At this stage of the simulation, all interactions between the particles and the enclosure are turned off (e.g., any potential between the two is unengaged). Accordingly, at this stage, particles can occupy the same three-dimensional space as atoms in the enclosure.

In block 1215 the component engages the long-range term of the SSCP and simulates the long-range stage of SGTI with only the long-range term of the SSCP engaged and affecting interactions between the particles and the enclosure. In some embodiments, the component can ramp up the long-range term of the SSCP from an unengaged state to an engaged state during the long-range SGTI. In this stage of the simulation, particles can move through the walls of the enclosure to move towards a final arrangement inside and outside the enclosure.

In block 1220, the component engages the short-range term of the SSCP simulates the short-range stage of SGTI with both the long and short-range terms of the SSCP engaged and affecting interactions between the particles and the enclosure. In some embodiments, the component can ramp up the short-range term of the SSCP from an unengaged state to an engaged state during the short-range SGTI. In this stage of the simulation, particles can move through the walls of the enclosure to move towards a final arrangement inside and outside the enclosure.

In block 1225 the component swaps the SSCP with the target HCP. In this stage of the simulation, assuming a classical paradigm, particles cannot move through the walls of the enclosure (particles move through the wall only infrequently in the quantum-mechanical paradigm), allowing particles inside the enclosure to move towards a final arrangement inside the enclosure.

At the end of this process, the component can continue the simulation using the filled state of the enclosure. Such continuing simulation may be of either classical or quantum-mechanical form.

In block 1230 the component facilitates analyzing the arrangement of particles in the overlapped system. For example, the component can record and/or output one or more metrics on the particles in the representation, including particle density, relative concentration, arrangement, diffusivity, and/or characterization of physical or electronic structure, as some examples.

Figure 13:
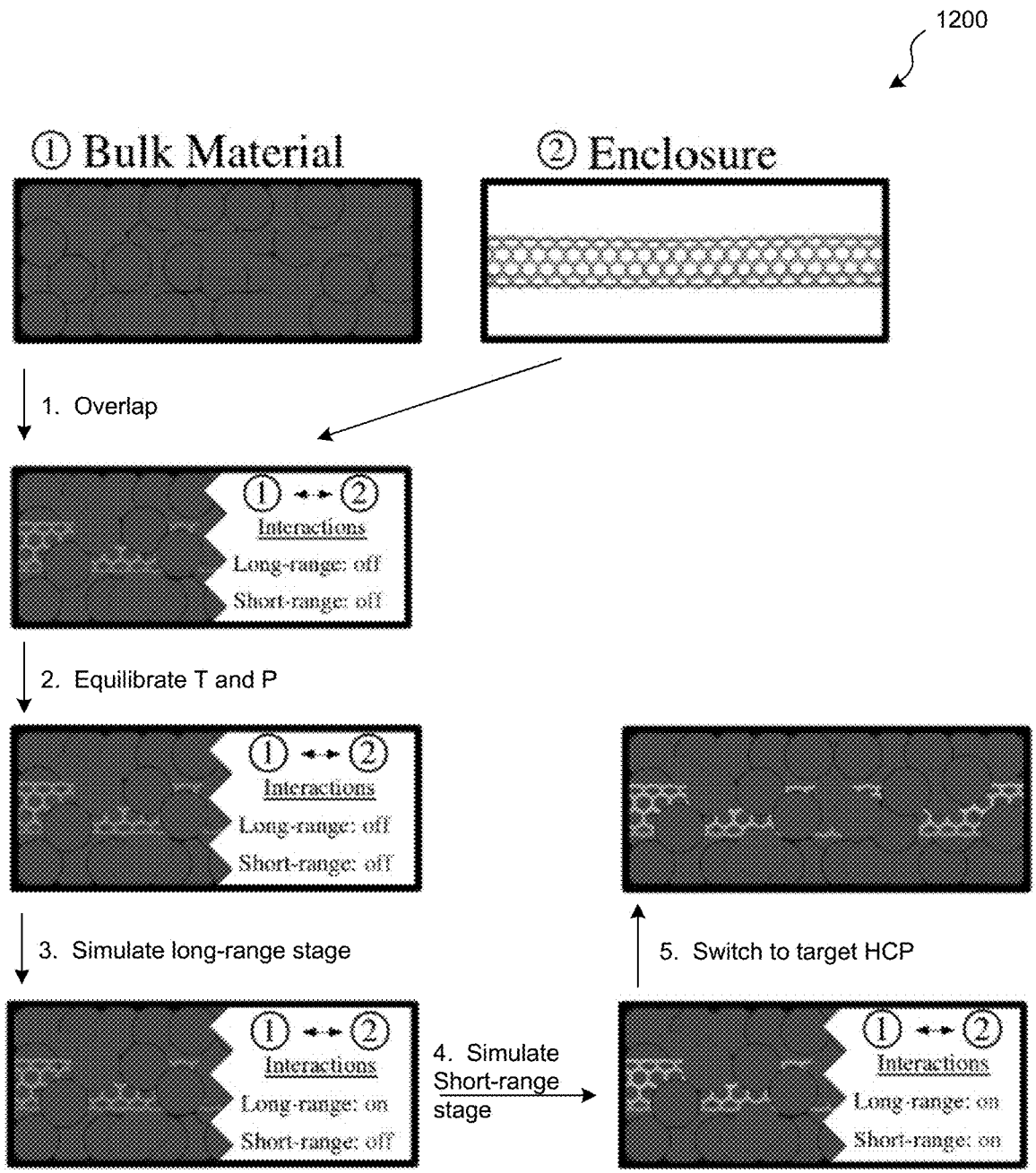
FIG. 13 is a schematic diagram of a particular embodiment of a process flow for arranging ionic liquid particles in a carbon nanotube according to the process outlined in FIG. 12.

FIG. 13 is a schematic diagram of a particular embodiment of a process flow for arranging particles in an enclosure. In the illustrated embodiment, the process flow arranges ionic liquid particles in a carbon nanotube according to the process outlined in FIG. 12. In particular, the simulation process begins by initializing the ionic liquid particles in a bulk system 1301 and initializing and equilibrating the carbon nanotube in an enclosure system 1302. In representation 1310, resulting from step 1, the two systems have been overlapped into the simulation system while the SSCP is unengaged (e.g., turned off, damped). In representation 1320, resulting from step 2, the ionic liquid and/or the carbon nanotube have been equilibrated in the simulation system the SSCP remains unengaged. In representation 1330, resulting from step 3, the long-range section of the SSCP has been engaged and the system has performed long-range SGTI. In representation 1340, resulting from step 4, the short-range section of the SSCP has been engaged and the system has performed short-range SGTI while both sections of the SSCP are engaged. In representation 1350, resulting from step 4, the SSCP has been swapped for the target HCP.

Figure 14:
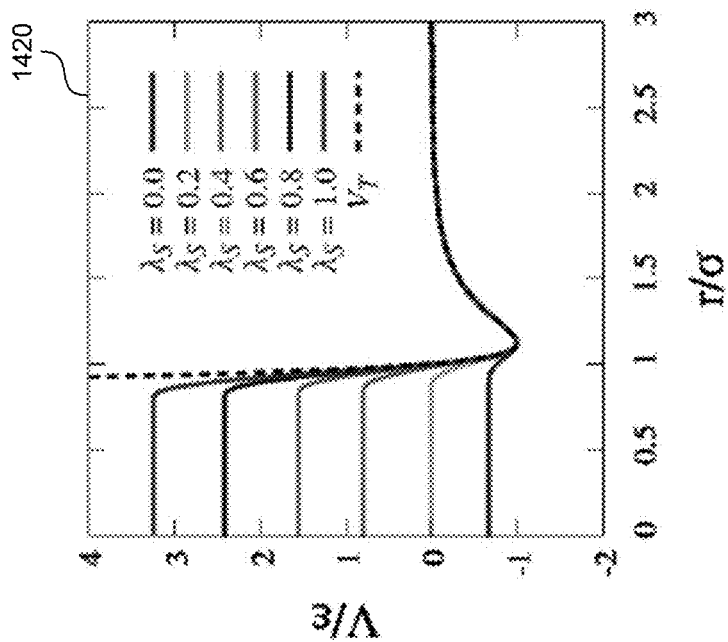
FIG. 14 is a graphical depiction of the long-range and short-range dimensionless profiles of the spliced soft-core potential according to some embodiments of the present technology.
Figure 14:
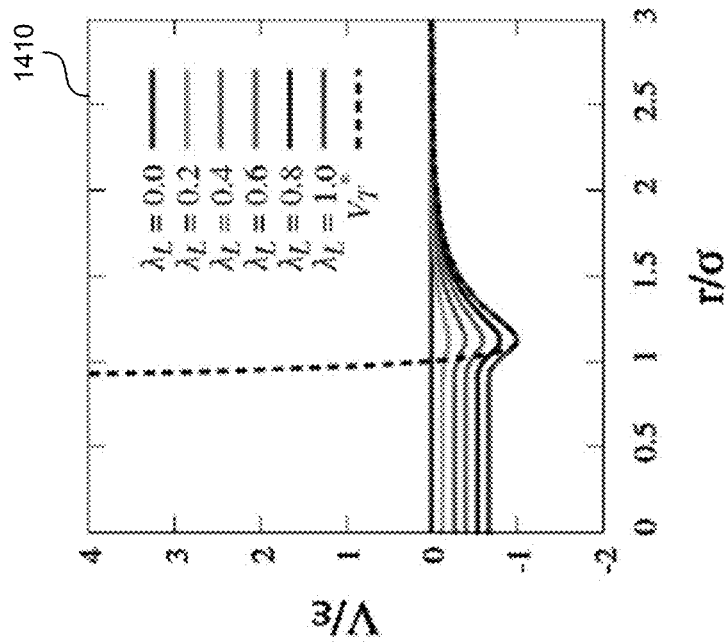

FIG. 14 is a graphical depiction of the long-range and short-range dimensionless profiles of the SSCP according to some embodiments of the present technology. In particular, graph 1410 shows the long-range stage, in which the simulation is operated for a period of time using the V function in which a parameter for the long range stage, $\lambda_L$, is advanced from 0 to 1. Similarly, graph 1420 shows the short-range stage, in which the simulation is operated using V functions in which a parameter for the short-range stage, $\lambda_S$, is advanced from 0 to 1.

The computing devices and computing systems on which simulations may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the systems. The data transmission media is used for transmitting data via transitory, propagating signals or carrier waves (e.g., electromagnetism) via a wired or wireless connection.

The systems may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

The following paragraphs describe various embodiments of aspects of the SSCP system. An implementation of the SSCP system may employ any combination of the embodiments. The processing of the methods described below may be performed by a computing device with a processor that executes computer-executable instructions stored on a computer-readable storage medium that implements the SSCP system.

In some embodiments, a method performed by one or more computing systems is provided for simulating an arrangement of particles within an enclosure. The method initializes a three-dimensional representation containing the enclosure and the particles. The particles are represented in a first arrangement in which the particles are distributed throughout the three-dimensional representation. In some embodiments, particles in the first arrangement overlap with the enclosure. The method conducts a first simulation stage to transition the three-dimensional representation from the first arrangement to a second arrangement of the particles. In the first simulation stage, the particles are allowed to move through a wall of the enclosure under the assumption that no repulsive force between the particles and the enclosure is engaged. The method conducts a second simulation stage to transition the three-dimensional representation from the second arrangement to a third arrangement of the particles. In the second simulation stage, the particles are allowed to move through the wall of the enclosure under the assumption that only a fraction of the repulsive force between the particles and the enclosure is engaged. In some embodiments, the method performs simulated annealing of the particles during the first simulation stage by raising a temperature of the simulated system from a first temperature to a second temperature and raising a pressure of the simulated system from a first pressure to a second pressure. In some embodiments, the method ramps up a spliced soft-core potential while the simulated system is at the second temperature and the second pressure during the second simulation stage.

In some embodiments the method conducts a third simulation stage to transition the three-dimensional representation from the third arrangement to a fourth arrangement of the particles. In some embodiments, the method performs simulated annealing of the particles during the third simulation stage by decreasing the temperature of the simulated system from the second temperature to a third temperature and decreasing the pressure from the second pressure to a third pressure. In some embodiments, the method performs long range slow growth thermodynamic integration using a long-range section of a spliced soft-core potential during the first simulation stage and performs short range slow growth thermodynamic integration using a complete spliced soft-core potential during the second simulation stage. In some embodiments, the method analyzes the third state of the simulated system to determine one or more metrics about the particles.

In some embodiments, a method performed by one or more computing systems is provided for simulating an arrangement of particles within an enclosure. The method generates a representation of the particles and the enclosure. The method modifies the representation so that the particles, represented as being in a bulk material system, are represented as being equilibrated at a first temperature and a first pressure. The method modifies the representation so that the enclosure, represented as being in an enclosure system, is represented as being equilibrated at the first temperature and the first pressure. The method modifies the representation so that the bulk material system and the enclosure system are represented as being overlapped in an overlapped system at the first temperature and the first pressure. The method modifies the representation so that the overlapped system is represented as being heated and pressurized to a second temperature higher than the first temperature and a second pressure higher than the first pressure. The method modifies the representation so that the overlapped system is represented with a spliced soft-core potential affecting interactions between the enclosure and the particles by transitioning the spliced soft-core potential from an unengaged state to an engaged state. The method modifies the representation so that the overlapped system is represented as being cooled and depressurized to a third temperature lower than the second temperature and a third pressure lower than the second pressure with the spliced soft-core potential between the enclosure and the particles fully engaged. In some embodiments, the method modifies the representation so that the overlapped system is represented with a hard-core potential affecting interactions between the enclosure and the particles after the representation of the overlapped system reaches the third temperature and the third pressure. In some embodiments, method separately thermostates the representation of the particles and the representation of the enclosure such that only the representation of the particles is heated and pressurized. In some embodiments, after the method modifies the overlapped system such that the overlapped system is represented with a hard-core potential affecting interactions between the enclosure and the particles, the method modifies the representation so that the particles and the enclosure in the overlapped system are represented as being equilibrated at the third temperature and the third pressure. In some embodiments, the method modifies the representation so that the heating and pressurizing of the overlapped system modifies the representation of the pressurization of the particles to maintain a constant density in the particles during annealing. In some embodiments, the method defines the spliced soft-core potential using Equation 1. In some embodiments, the method defines the hard-core potential as a 6-12 Lennard-Jones potential. In some embodiments, the method defines the hard-core potential using Equation 3 when 2=1. In some embodiments, after the representation of the overlapped system reaches the third temperature and the third pressure, the method records one or more metrics on the representation of the particles contained in the representation of the enclosure. In some embodiments, the one or more metrics on recorded by the method includes the number of particles represented as contained in the enclosure. In some embodiments, the one or more metrics on recorded by the method includes the position of the particles represented as contained in the enclosure. In some embodiments, the one or more metrics on recorded by the method includes the radial density of the particles represented as contained in the enclosure.

In some embodiments, a method performed by one or more computing systems for simulating an arrangement of an ionic liquid within a carbon nanotube is provided. The method generates a representation of the ionic liquid and the carbon nanotube. The method modifies the representation so that the ionic liquid in a bulk material system is represented as being equilibrated at a first temperature and a first pressure. The method modifies the representation so that the carbon nanotube in an enclosure system is represented as being equilibrated at the first temperature and the first pressure. The method modifies the representation so that the bulk material system and the enclosure system are represented as being overlapped in an overlapped system at the first temperature and the first pressure. The method modifies the representation so that the ionic liquid is represented as being heated and pressurized to a second temperature higher than the first temperature and a second pressure higher than the first pressure. The method modifies the representation so that the overlapped system is represented with a spliced soft-core potential affecting interactions between molecules in the ionic liquid and atoms in the carbon nanotube by transitioning the spliced soft-core potential from an unengaged state to an engaged state. The method modifies the representation so that the ionic liquid is represented as being cooled and depressurized to a third temperature lower than the second temperature and a third pressure lower than the second pressure with the spliced soft-core potential between the ionic liquid and the carbon nanotube fully engaged. The method modifies the representation so that the overlapped system is represented with a hard-core potential affecting interactions between the molecules in the ionic liquid and the atoms in the carbon nanotube. In some embodiments, the method modifies the representation so that the ionic liquid is represented as being heated and pressurized by modifying the representation in a series of steps. The method simulates molecular interactions in the isothermal-isobaric ensemble in the representation for a predefined number of timesteps at the first temperature and the first pressure. The method then modifies the representation by transitioning a represented temperature the ionic liquid from the first temperature to the second temperature in by: increasing the represented temperature to a ramped temperature using Equation 10, increasing a represented pressure of the ionic liquid to a ramped pressure using Equation 16 and the ramped temperature; modifying the representation by simulating molecular interactions in the isothermal-isobaric ensemble for the predefined number of timesteps at the ramped temperature and the ramped pressure. In some embodiments, the method can then repeat these steps as many times as necessary. In some embodiments, the method modifies the representation so that the overlapped system is represented with a spliced soft-core potential affecting interactions between molecules in the ionic liquid and atoms in the carbon nanotube in a series of steps. The method simulates molecular interactions in the isothermal-isobaric ensemble for a predefined number of timesteps while the overlapped system is represented with the spliced soft-core potential in a first, damped state. The method then modifies the representation by transitioning the representation of the spliced soft-core potential from the first state to a second, engaged state in repeated steps including: increasing an engagement parameter of the representation of the spliced soft-core potential that affecting the engagement of the splice soft-core potential on interactions between the molecules in the ionic liquid and the atoms in the carbon nanotube to a ramped state using Equation 10; modifying the representation by simulating molecular interactions in the isothermal-isobaric ensemble for the predefined number of timesteps while the spliced soft-core potential is in the ramped state; and modifying the representation by simulating molecular interactions in the isothermal-isobaric ensemble for the predefined number of timesteps at the second temperature and the second pressure. In some embodiments, method modifies the representation so that the ionic liquid is represented as being cooled and depressurized in a series of steps. The method modifies the representation by simulating molecular interactions in the isothermal-isobaric ensemble for a predefined number of timesteps at the second temperature and the second pressure. Then the method modifies the representation by transitioning a represented temperature the ionic liquid from the second temperature to the third temperature in repeated steps including: lowering the represented temperature to a ramped temperature using Equation 10, lowering a represented pressure of the ionic liquid to a ramped pressure using Equation 16 and the ramped temperature, modifying the representation by simulating molecular interactions in the isothermal-isobaric ensemble for the predefined number of timesteps at the ramped temperature and the ramped pressure. In some embodiments, the method modifies the representation by simulating molecular interactions in the isothermal-isobaric ensemble for a predefined number of timesteps at the third temperature and the third pressure while the overlapped system is represented with a spliced soft-core potential fully engaged. In some embodiments, the method modifies the representation by simulating molecular interactions in the isothermal-isobaric ensemble for a predefined number of timesteps at the third temperature and the third pressure after modifying the representation so that the overlapped system is represented with the hard-core potential affecting interactions between the molecules in the ionic liquid and the atoms in the carbon nanotube. In some embodiments, the method records one or more metrics on the representation of the ionic liquid contained in the carbon nanotube after modifying the representation so that the overlapped system is represented with the hard-core potential affecting interactions between the molecules in the ionic liquid and the atoms in the carbon nanotube. In some embodiments, the date recorded includes the representation of the number of ions contained in the carbon nanotube. In some embodiments, the date recorded includes the representation of the ration of cations to anions in the carbon nanotube. In some embodiments, the date recorded includes the representation of the position of the ions contained in the carbon nanotube. In some embodiments, the date recorded includes the representation of the radial density of the ions contained in the carbon nanotube. In some embodiments, before modifying the representation so that the ionic liquid is represented as heated and pressurized, the method modifies the representation by representing the carbon nanotube as electrically charged. In some embodiments, the method defines the spliced soft-core potential using Equation 1. In some embodiments, the method defines the hard-core potential using Equation 3 with $\lambda=1$.

In some embodiments, a method performed by one or more computing systems for simulating an arrangement of particles within an enclosure is provided. The method generates a representation of the particles and the enclosure. The method modifies the representation so that the bulk material system and the enclosure system are represented as being overlapped in a simulation system at a target temperature and a target pressure. The method modifies the representation so that the particles and the enclosure are represented as equilibrated in the simulation system at the target temperature and the target pressure. The method modifies the representation so that the simulation system is represented with a long-range section of a spliced soft-core potential affecting interactions between the particles and the enclosure. The method modifies the representation through long range slow growth thermodynamic integration. The method modifies the representation so that the simulation system is represented with a short-range section of the spliced soft-core potential affecting interactions between the particles and the enclosure in addition to the long-range section. The method modifies the representation through short range slow growth thermodynamic integration. The method modifies the representation so that the simulated system is represented with a hard-core potential affecting interactions between the particles and the enclosure. In some embodiments, the method defines the spliced soft-core potential using Equation 1. In some embodiments, the method defines the hard-core potential using Equation 3 with $\lambda=1$. In some embodiments, the method analyzes the representation of the simulated system to determine one or more metrics about the representation of the particles. In some embodiments, the metrics include the number of particles contained in the enclosure. In some embodiments, the metrics include the position of the particles contained in the enclosure. In some embodiments, the metrics include the radial density of the particles contained in the enclosure. In some embodiments, the particles are anions and cations in an ionic liquid, and the enclosure is a carbon nanotube.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:
1. A method performed by one or more computing systems for simulating an arrangement of particles within an enclosure, the method comprising:
   initializing a three-dimensional representation containing the enclosure and the particles, wherein the particles are represented in a first arrangement in which the particles are distributed throughout the three-dimensional representation and allowed to overlap with the enclosure;
   conducting a first simulation stage to transition the three-dimensional representation from the first arrangement to a second arrangement of the particles, wherein the particles are allowed to move through a wall of the enclosure during the first simulation stage under an assumption that no repulsive force between the particles and the enclosure is engaged; and
   conducting a second simulation stage to transition the three-dimensional representation from the second arrangement to a third arrangement of the particles, wherein the particles are allowed to move through the wall of the enclosure during the second simulation stage under an assumption that only a fraction of the repulsive force between the particles and the enclosure is engaged.

2. The method of claim 1 wherein:
the first simulation stage includes simulated annealing of the particles to raise a temperature of the simulated system from a first temperature to a second temperature and raise a pressure of the simulated system from a first pressure to a second pressure; and
the second simulation stage includes ramping up a spliced soft-core potential while the simulated system is at the second temperature and the second pressure.

3. The method of claim 2, further comprising conducting a third simulation stage with respect to the simulated system to transition the three-dimensional representation from the third arrangement to a fourth arrangement of the particles, wherein the third simulation stage includes simulated annealing of the particles to decrease the temperature of the simulated system from the second temperature to a third temperature and decrease the pressure from the second pressure to a third pressure.

4. The method of claim 1 wherein:
the first simulation stage includes long range slow growth thermodynamic integration using a long-range section of a spliced soft-core potential; and
the second simulation stage includes short range slow growth thermodynamic integration using a complete spliced soft-core potential.

5. The method of claim 1, further comprising analyzing the simulated system in the third arrangement to determine one or more metrics about the particles.

6. A method performed by one or more computing systems for simulating an arrangement of particles within an enclosure, the method comprising:
generating a representation of the particles and the enclosure, wherein the particles are represented in a bulk material system and the enclosure is represented in an enclosure system;
modifying the representation so that the particles are represented as being equilibrated at a first temperature and a first pressure in the bulk material system;
modifying the representation so that the enclosure is represented as being equilibrated at the first temperature and the first pressure in the enclosure system;
modifying the representation so that the bulk material system and the enclosure system are represented as being overlapped in an overlapped system at the first temperature and the first pressure;
modifying the representation so that the overlapped system is represented as heated and pressurized to a second temperature higher than the first temperature and a second pressure higher than the first pressure;
modifying the representation so that the overlapped system is represented with a spliced soft-core potential affecting interactions between the enclosure and the particles by transitioning the spliced soft-core potential from an unengaged state to an engaged state; and
modifying the representation so that the overlapped system is represented as cooled and depressurized to a third temperature lower than the second temperature and a third pressure lower than the second pressure with the spliced soft-core potential between the enclosure and the particles engaged.

7. The method of claim 6, further comprising modifying the representation so that the overlapped system is represented with a hard-core potential affecting interactions between the enclosure and the particles after the representation of the overlapped system is cooled and depressurized to the third temperature and the third pressure.

8. The method of claim 6, wherein modifying the representation so that the overlapped system is represented as heated and pressurized comprises separately thermostating the representation of the particles and the representation of the enclosure such that only the representation of the particles are heated and pressurized.

9. The method of claim 6, further comprising modifying the representation so that the particles and the enclosure in the overlapped system are represented equilibrated at the third temperature and the third pressure after modifying the overlapped system such that the overlapped system is represented with a hard-core potential affecting interactions between the enclosure and the particles.

10. The method of claim 8 wherein modifying the representation so that the overlapped system is represented as heated and pressurized is configured to modify the representation of the pressure the particles to maintain a constant density in the particles during annealing.

11. The method of claim 6 wherein the spliced soft-core potential is given by $$V(r) = \begin{cases} V_S(f_S r_s), & 0 \leq r < f_S r_s \\ V_S, & f_S r_s \leq r < r_s \\ V_T, & r \geq r_s \end{cases}$$

wherein $V_S$ is a fourth order polynomial, $r_s$ is a splice point, $f_s$ is a positive fraction less than one, $V_T$ is a target hard-core potential.

12. The method of claim 7 wherein the hard-core potential is a 6-12 Lennard-Jones potential.

13. The method of claim 7 wherein the hard-core potential is given by $$V_T(r) = 4\lambda \varepsilon \left[ \left(\frac{\sigma}{r}\right)^{12} - \left(\frac{\sigma}{r}\right)^6 \right] + \frac{k q_1(\lambda) q_2(\lambda)}{r} \text{ when } \lambda = 1,$$

wherein $\lambda$ is an engagement parameter, $q_1$ is a charge of a represented particle, $q_2$ is a charge of a represented atom in the enclosure, $\varepsilon$ is a depth of a potential well, and $\sigma$ is a distance between the represented particle and the represented atom.

14. The method of claim 6, further comprising recording one or more metrics on the representation of the particles contained in the representation of the enclosure after the representation of the overlapped system reaches the third temperature and the third pressure.

15. The method of claim 14 wherein the one or more metrics include:
the number of particles represented as contained in the enclosure;
the position of the particles represented as contained in the enclosure; and
the radial density of the particles represented as contained in the enclosure.

16. A method performed by one or more computing systems for simulating an arrangement of an ionic liquid within a carbon nanotube, the method comprising:
generating a representation of the ionic liquid in a bulk material system and the carbon nanotube in an enclosure system;

modifying the representation so that the ionic liquid is represented as being equilibrated at a first temperature and a first pressure in the bulk material system;

modifying the representation so that the carbon nanotube is represented as being equilibrated at the first temperature and the first pressure in the enclosure system;

modifying the representation so that the bulk material system and the enclosure system are represented as being overlapped in an overlapped system at the first temperature and the first pressure;

modifying the representation so that the ionic liquid is represented as heated and pressurized to a second temperature higher than the first temperature and a second pressure higher than the first pressure;

modifying the representation so that the overlapped system is represented with a spliced soft-core potential affecting interactions between molecules in the ionic liquid and atoms in the carbon nanotube by transitioning the spliced soft-core potential from an unengaged state to an engaged state;

modifying the representation so that the ionic liquid is represented as cooled and depressurized to a third temperature lower than the second temperature and a third pressure lower than the second pressure with the spliced soft-core potential between the ionic liquid and the carbon nanotube engaged; and modifying the representation so that the overlapped system is represented with a hard-core potential affecting interactions between the molecules in the ionic liquid and the atoms in the carbon nanotube.

17. The method of claim 16 wherein modifying the representation so that the ionic liquid is represented as heated and pressurized includes:

modifying the representation by simulating molecular interactions in an isothermal-isobaric ensemble in the representation for a predefined number of timesteps at the first temperature and the first pressure; and modifying the representation by transitioning a represented temperature of the ionic liquid from the first temperature to the second temperature in repeated steps, the steps including:

increasing the represented temperature to a ramped temperature using $$R(t) = R_0 + \frac{R_f - R_0}{1 + \exp(-15(t - t_m))},$$

wherein R(t) is the represented temperature at a time t, $R_0$ is an initial represented temperature, $R_f$ is the ramped temperature, and $t_m$ is a midpoint time;

increasing a represented pressure of the ionic liquid to a ramped pressure, the ramped pressure given by $P(T)=P_0+(T-T_0)^2+b(T-T_0)$ using the ramped temperature, wherein P(T) is the ramped pressure for the ramped temperature T, $P_0$ is an initial represented pressure, $T_0$ is the initial represented temperature, and a and b are fixed parameters;

modifying the representation by simulating isothermal-isobaric molecular interactions for the predefined number of timesteps at the ramped temperature and the ramped pressure.

18. The method of claim 16 wherein modifying the representation so that the overlapped system is represented with a spliced soft-core potential affecting interactions between molecules in the ionic liquid and atoms in the carbon nanotube includes:

modifying the representation by simulating molecular interactions in an isothermal-isobaric ensemble for a predefined number of timesteps while the overlapped system is represented with the spliced soft-core potential in a first state, wherein the first state defines a damped spliced soft-core potential;

modifying the representation by transitioning the representation of the spliced soft-core potential from the first state to a second state in repeated steps, wherein the second state defines a fully engaged spliced soft-core potential and wherein the repeated steps include:

increasing an engagement parameter of the representation of the spliced soft-core potential to a ramped state using $$R(t) = R_0 + \frac{R_f - R_0}{1 + \exp(-15(t - t_m))},$$

the engagement parameter affecting the engagement of the splice soft-core potential on interactions between the molecules in the ionic liquid and the atoms in the carbon nanotube, wherein R(t) is the engagement parameter at a time t, $R_0$ is an initial engagement parameter, $R_f$ is the ramped engagement parameter, and $t_m$ is a midpoint time; and modifying the representation by simulating molecular interactions in the isothermal-isobaric ensemble for the predefined number of timesteps while the spliced soft-core potential is in the ramped state; and modifying the representation by simulating molecular interactions in the isothermal-isobaric ensemble for the predefined number of timesteps at the second temperature and the second pressure while the spliced soft-core potential is in the second state.

19. The method of claim 16 wherein modifying the representation so that the ionic liquid is represented as being cooled and depressurized includes:

modifying the representation by simulating molecular interactions in an isothermal-isobaric ensemble for a predefined number of timesteps at the second temperature and the second pressure;

modifying the representation by transitioning a represented temperature of the ionic liquid from the second temperature to the third temperature in repeated steps, the steps including:

lowering the represented temperature to a ramped temperature using $$R(t) = R_0 + \frac{R_f - R_0}{1 + \exp(-15(t - t_m))},$$

wherein R(t) is the represented temperature at a time t, $R_0$ is an initial represented temperature, $R_f$ is the ramped temperature, and $t_m$ is a midpoint time;

lowering a represented pressure of the ionic liquid to a ramped pressure, the ramped pressure given by $P(T)= P_0+(T-T_0)^2+b(T-T_0)$ using the ramped temperature, wherein P(T) is the ramped pressure for the ramped temperature T, $P_0$ is an initial represented pressure, $T_0$ is the initial represented temperature, and a and b are fixed parameters;

modifying the representation by simulating molecular interactions in the isothermal-isobaric ensemble for the predefined number of timesteps at the ramped temperature and the ramped pressure.

20. The method of claim 16, further comprising modifying the representation by simulating molecular interactions in an isothermal-isobaric ensemble for a predefined number of timesteps at the third temperature and the third pressure while the overlapped system is represented with a spliced soft-core potential fully engaged.

21. The method of claim 16, further comprising modifying the representation by simulating molecular interactions in an isothermal-isobaric ensemble for a predefined number of timesteps at the third temperature and the third pressure after modifying the representation so that the overlapped system is represented with the hard-core potential affecting interactions between the molecules in the ionic liquid and the atoms in the carbon nanotube.

22. The method of claim 16, further comprising recording one or more metrics on the representation of the ionic liquid contained in the carbon nanotube after modifying the representation so that the overlapped system is represented with the hard-core potential affecting interactions between the molecules in the ionic liquid and the atoms in the carbon nanotube.

23. The method of claim 22 wherein the one or more metrics include:
the representation of the number of ions contained in the carbon nanotube;
the representation of the ratio of cations to anions in the carbon nanotube;
the representation of the position of the ions contained in the carbon nanotube; and
the representation of the radial density of the ions contained in the carbon nanotube.

24. The method of claim 16, further comprising modifying the representation by representing the carbon nanotube as electrically charged before modifying the representation so that the ionic liquid is represented as heated and pressurized.

25. The method of claim 16, wherein the spliced soft-core potential is given by $$V(r) = \begin{cases} V_S(f_S r_s), & 0 \le r < f_S r_s \\ V_S, & f_S r_s \le r < r_s \\ V_T, & r \ge r_s \end{cases},$$

wherein $V_S$ is a fourth order polynomial, $r_s$ is a splice point, $f_s$ is a positive fraction less than one, $V_T$ is a target hard-core potential.

26. The method of claim 16, wherein the hard-core potential is given by $$V_T(r) = 4\lambda \epsilon \left[ \left(\frac{\sigma}{r}\right)^{12} - \left(\frac{\sigma}{r}\right)^6 \right] + \frac{kq_1(\lambda)q_2(\lambda)}{r} \text{ with } \lambda = 1,$$

with $\lambda=1$, wherein $\lambda$ is an engagement parameter, $q_1$ is a charge of a represented particle, $q_2$ is a charge of a represented atom in the enclosure, $\epsilon$ is a depth of a potential well, and $\sigma$ is a distance between the represented particle and the represented atom.

27. A method performed by one or more computing systems for simulating an arrangement of particles within an enclosure, the method comprising:

generating a representation of the particles in a bulk material system and the enclosure in an enclosure system;
modifying the representation so that the bulk material system and the enclosure system are represented as overlapped in a simulation system at a target temperature and a target pressure;
modifying the representation so that the particles and the enclosure are represented as equilibrated in the simulation system at the target temperature and the target pressure;
modifying the representation so that the simulation system is represented with a long-range section of a spliced soft-core potential affecting interactions between the particles and the enclosure;
modifying the representation through long range slow growth thermodynamic integration;
modifying the representation so that the simulation system is represented with a short-range section of the spliced soft-core potential affecting interactions between the particles and the enclosure in addition to the long-range section;
modifying the representation through short range slow growth thermodynamic integration; and
modifying the representation so that the simulated system is represented with a hard-core potential affecting interactions between the particles and the enclosure.

28. The method of claim 27, further comprising analyzing the representation of the simulated system to determine one or more metrics about the representation of the particles.

29. The method of claim 27, wherein the spliced soft-core potential is given by $$V(r) = \begin{cases} V_S(f_S r_s), & 0 \le r < f_S r_s \\ V_S, & f_S r_s \le r < r_s \\ V_T, & r \ge r_s \end{cases},$$

wherein $V_S$ is a fourth order polynomial, $r_s$ is a splice point, $f_s$ is a positive fraction less than one, $V_T$ is a target hard-core potential.

30. The method of claim 27, wherein the hard-core potential is given by $$V_T(r) = 4\lambda \epsilon \left[ \left(\frac{\sigma}{r}\right)^{12} - \left(\frac{\sigma}{r}\right)^6 \right] + \frac{kq_1(\lambda)q_2(\lambda)}{r} \text{ with } \lambda = 1,$$

with $\lambda=1$, wherein $\lambda$ is an engagement parameter, $q_1$ is a charge of a represented particle, $q_2$ is a charge of a represented atom in the enclosure, $\epsilon$ is a depth of a potential well, and $\sigma$ is a distance between the represented particle and the represented atom.

31. The method of claim 27, wherein:
the particles are anions and cations in an ionic liquid; and
the enclosure is a carbon nanotube.

32. The method of claim 28 wherein the one or more metrics include:
the number of particles contained in the enclosure;
the position of the particles contained in the enclosure; and
the radial density of the particles contained in the enclosure.

* * * * *